United States Patent
Chen et al.

(10) Patent No.: US 10,764,927 B2
(45) Date of Patent: Sep. 1, 2020

(54) SYSTEMS AND METHODS FOR DYNAMICALLY SELECTING AND ADJUSTING ENERGY DETECTION THRESHOLDS (EDTS) IN UNCOORDINATED RADIO NODES DEPLOYING LISTEN BEFORE TALK TO IMPROVE THROUGHPUT ON SHARED SPECTRUM

(71) Applicant: Corning Optical Communications LLC, Hickory, NC (US)

(72) Inventors: Tsung-Yi Chen, San Jose, CA (US); Hithesh Nama, Los Altos, CA (US); Jiadong Wang, San Diego, CA (US)

(73) Assignee: CORNING OPTICAL COMMUNICATIONS LLC, Charlotte, NC (US)

( * ) Notice: Subject to any disclaimer, the term of this patent is extended or adjusted under 35 U.S.C. 154(b) by 0 days.

(21) Appl. No.: 16/203,497

(22) Filed: Nov. 28, 2018

(65) Prior Publication Data

US 2019/0098666 A1    Mar. 28, 2019

Related U.S. Application Data

(63) Continuation of application No. PCT/US2018/035714, filed on Jun. 1, 2018.
(Continued)

(51) Int. Cl.
*H04W 74/08*    (2009.01)
*H04L 12/26*    (2006.01)
(Continued)

(52) U.S. Cl.
CPC ...... *H04W 74/0816* (2013.01); *H04B 17/318* (2015.01); *H04B 17/336* (2015.01);
(Continued)

(58) Field of Classification Search
CPC ......... H04W 74/0816; H04W 74/0808; H04W 16/14; H04W 24/10; H04W 74/0825;
(Continued)

(56) References Cited

U.S. PATENT DOCUMENTS

2007/0286122 A1* 12/2007 Fonseca ................ H04L 1/0021
370/329
2013/0017794 A1   1/2013 Kloper et al.
(Continued)

FOREIGN PATENT DOCUMENTS

WO    2017026981 A1    2/2017

OTHER PUBLICATIONS

Laufer et al; "The Capacity of Wireless CSMA/CA Networks" : IEEE/ACM Transactions on Networking; vol. 24, No. 3, Jun. 2016; pp. 1518-1532.
(Continued)

*Primary Examiner* — Peter P Chau
(74) *Attorney, Agent, or Firm* — C. Keith Montgomery

(57) ABSTRACT

Systems and methods for dynamically selecting and adjusting energy detection thresholds (EDTs) in uncoordinated radio nodes deploying Listen Before Talk to improve throughput on shared spectrum are disclosed. The uncoordinated radio nodes dynamically adjust an EDT to avoid harmful collisions with neighboring radio nodes or otherwise improve throughput over shared spectrum. A radio node can detect a collision or radio frequency (RF) interference from a neighboring radio node. Once the collision or RF interference is detected, the EDT of the radio node is dynamically adjusted. In some cases, the collision or RF interference can be avoided by calculating a throughput of the radio node while operating on each of a plurality of EDTs and selecting the EDT predicted to result in a higher throughput. In other cases, the EDT may be dynamically
(Continued)

adjusted based on an iterative approach which incorporates measurements of the neighboring radio node.

19 Claims, 11 Drawing Sheets

Related U.S. Application Data

(60) Provisional application No. 62/516,269, filed on Jun. 7, 2017.

(51) Int. Cl.
  *H04B 17/318* (2015.01)
  *H04B 17/336* (2015.01)
  *H04L 1/00* (2006.01)
  *H04W 16/14* (2009.01)
  *H04W 24/10* (2009.01)
  *H04W 28/18* (2009.01)

(52) U.S. Cl.
  CPC ........ *H04L 1/0003* (2013.01); *H04L 43/0888* (2013.01); *H04W 16/14* (2013.01); *H04W 24/10* (2013.01); *H04W 74/0808* (2013.01); *H04W 74/0825* (2013.01); *H04W 28/18* (2013.01)

(58) Field of Classification Search
  CPC .. H04W 28/18; H04L 43/0888; H04L 1/0003; H04B 17/318; H04B 17/336
  See application file for complete search history.

(56) References Cited

U.S. PATENT DOCUMENTS

| | | |
|---|---|---|
| 2014/0348004 A1* | 11/2014 | Ponnuswamy ......... H04L 1/203 370/242 |
| 2014/0376453 A1 | 12/2014 | Smith |
| 2016/0112969 A1* | 4/2016 | Zhou .................... H04W 24/08 370/252 |
| 2016/0227489 A1 | 8/2016 | Oteri et al. |
| 2017/0134975 A1 | 5/2017 | Huang et al. |
| 2017/0280460 A1* | 9/2017 | Emmanuel ........... H04L 47/365 |
| 2018/0014328 A1 | 1/2018 | Subramani et al. |
| 2018/0110073 A1 | 4/2018 | Mestanov et al. |
| 2018/0176890 A1 | 6/2018 | Moon et al. |
| 2018/0242222 A1* | 8/2018 | Shinohara ............ H04L 1/0001 |
| 2018/0288705 A1* | 10/2018 | Park ..................... H04L 27/183 |
| 2018/0317258 A1* | 11/2018 | Wu ................... H04W 74/0808 |
| 2019/0098666 A1 | 3/2019 | Chen et al. |
| 2019/0110297 A1 | 4/2019 | Hedayat et al. |
| 2019/0174435 A1 | 6/2019 | Tayamon et al. |
| 2019/0320466 A1 | 10/2019 | Mestanov et al. |

OTHER PUBLICATIONS

International Search Report and Written Opinion of the International Searching Aurthority; PCT/US2018/035714; dated October 5, 2018; 14 Pages; European Patent Office.

* cited by examiner

SYSTEMS AND METHODS FOR DYNAMICALLY SELECTING AND ADJUSTING ENERGY DETECTION THRESHOLDS (EDTS) IN UNCOORDINATED RADIO NODES DEPLOYING LISTEN BEFORE TALK TO IMPROVE THROUGHPUT ON SHARED SPECTRUM

CROSS-REFERENCE TO RELATED APPLICATIONS

This application is a continuation of International Application No. PCT/US18/35714, filed Jun. 1, 2018, which claims priority under 35 U.S.C. § 119(e) to U.S. Provisional Patent Application Ser. No. 62/516,269 entitled "INTELLIGENT SPATIAL REUSE OF LTE-LAA SYSTEMS" and filed on Jun. 7, 2017, which is incorporated herein by reference in its entirety.

BACKGROUND

The disclosure relates generally to wireless communications systems and related networks, such as Universal Mobile Telecommunications Systems (UMTSs), its offspring Long Term Evolution (LTE) and $5^{th}$ Generation New Radio (5G-NR) described and being developed by the Third Generation Partnership Project (3GPP), and more particularly to dynamically selecting and adjusting energy detection thresholds (EDTs) in uncoordinated radio nodes deploying listen before talk to improve throughput on shared spectrum.

Operators of mobile systems, such as UMTS and its offspring including LTE and LTE-Advanced, are increasingly relying on wireless macrocell radio access networks (RANs) (e.g., traditional cellular base stations), along with wireless small cell RANs in order to deploy, for example, indoor voice and data services to enterprises and other customers. Such small cell RANs typically utilize multiple-access technologies capable of supporting communications with multiple users using radio frequency (RF) signals and sharing available system resources such as bandwidth and transmit power. Evolved universal terrestrial radio access (E-UTRA) is the radio interface of 3GPP's LTE upgrade path for UMTS mobile networks. In these systems, there are different frequencies where LTE (or E-UTRA) can be used, and in such systems, user mobile communications devices connect to a serving system, which is represented by a cell.

For both macrocell RANs and small cell RANs, increasing demands for wireless throughput make access to additional wireless spectrum desirable. Examples of such additional wireless spectrum include unlicensed spectrum, shared spectrum, spectrum licensed from a third party, spectrum associated with citizens broadband radio service (CBRS), and so on. In these cases, spectrum allocation, or channel allocation, may be performed by a technique or procedures that occur independently or semi-independently of a mobile network operator (MNO), such as by a spectrum access system (SAS) for example. In this regard, radio nodes within the RANs may operate in the same wireless channel with neighboring radio nodes, which can result in collisions, or instances in which the neighboring radio nodes communicate at a same time, causing RF interference which impairs wireless communications.

Due to the desire by communications service providers to use shared spectrum, such as unlicensed spectrum, to gain additional bandwidth, potentially without additional licensing costs, mechanisms have been designed and implemented to avoid or reduce RF interference issues, including collisions, with use of shared spectrum. One such mechanism is "Listen Before Talk (LBT)." LBT is a mechanism proposed by the 3GPP for LTE in Unlicensed spectrum (LTE-U) and/or License Assisted Access (LAA) for minimizing RF interferences between two transceivers operating in the same shared channel(s) (e.g., unlicensed channel(s)). In this regard, a transceiver can start signal transmission of a communications signal in a shared channel after verifying that the shared channel is free for use, meaning that another transceiver is not presently transmitting signals in the same shared channel. Before transmission, the transceiver first listens to the activity "on the air" (i.e., on the shared channel where it intends to transmit), or verifies that the shared channel is not occupied by another transmission. If a transmission in the same shared channel is detected, the transmitter postpones its intended transmission until the shared channel is free. When two transceivers coordinate their activity through use of LBT, each transceiver will have a certain likelihood of finding transmission opportunities where a shared channel is free for transmission signals. Radio nodes incorporating LBT set an EDT at which the radio node "hears" traffic on the shared channel. In other words, if the radio node detects wireless signals at an energy level which exceeds the EDT, the channel is determined to be occupied and the radio node waits before communicating over the channel.

In this regard, FIG. 1 illustrates two neighboring radio nodes 100(1), 100(2) having different EDTs. A first radio node 100(1) has a higher EDT, such that it will only "hear" (e.g., respond to) radio signals which exceed a defined high EDT, represented here as a relatively small listening range 102(1). A second radio node 100(2) has a lower EDT than the first radio node 100(1), such that the second radio node 100(2) will hear radio signals exceeding a defined low EDT, represented here as a relatively large listening range 102(2). The listening range 102(1) of the first radio node 100(1) indicates that the first radio node 100(1) only hears signals which originate within the listening range due to its higher EDT. Accordingly, because of the higher EDT, the first radio node 100(1) does not hear signals from the second radio node 100(2), and while employing LBT the first radio node 100(1) will transmit signals even if the second radio node 100(2) is transmitting over the same channel. However, the listening range 102(2) of the second radio node 100(2) indicates that due to its lower EDT, the second radio node 100(2) hears signals from the second radio node 100(2), and while employing LBT the second radio node 100(2) will not transmit signals if the first radio node 100(1) is transmitting over the same channel.

In this manner, the second radio node 100(2) having a lower EDT can ensure that the second radio node 100(2) does not transmit when its transmissions might interfere with the first radio node 100(1) (e.g., a neighboring radio node), which can improve signal quality while reducing the amount of time the second radio node 100(2) occupies the shared channel. In contrast, a higher EDT can enable the first radio node 100(1) to occupy the same channel as the second radio node 100(2) (e.g., a neighboring radio node), increasing the amount of time the first radio node 100(1) occupies the channel while decreasing signal quality. Standards such as LTE-U or LAA may set a limit to the EDT (e.g., a maximum EDT value), but may otherwise allow radio nodes operating within the standard to set lower EDT values.

No admission is made that any reference cited herein constitutes prior art. Applicant expressly reserves the right to challenge the accuracy and pertinency of any cited documents.

SUMMARY

Embodiments of the disclosure relate to systems and methods for dynamically selecting and adjusting energy detection thresholds (EDTs) in uncoordinated radio nodes deploying listen before talk to improve throughput on shared spectrum. As an example, the radio nodes may be deployed as individual wireless access points or within distributed communications networks, such as a macrocell radio access network (RAN) (e.g., a traditional cellular base station) and/or a small cell RAN (e.g., a RAN deployed in an enterprise environment). Each radio node may support wireless communications over unlicensed spectrum, shared spectrum, spectrum licensed from a third party, or other spectrum in which access is arbitrated by an external service not under the control of the operator of the radio node. As an example, multiple radio nodes may be deployed within a geographical region, and may further be deployed within multiple RANs or similar networks which have limited or no ability to coordinate access to the shared spectrum. The radio nodes in aspects disclosed herein are configured to deploy mechanisms to avoid or reduce interference issues, including collisions, with use of the shared spectrum (e.g., unlicensed spectrum). One such mechanism is "Listen Before Talk (LBT)," as proposed by the Third Generation Partnership Project (3GPP) for LTE in Unlicensed spectrum (LTE-U) and License Assisted Access (LAA) for minimizing interferences between two transceivers (e.g., radio nodes) operating in the same shared channel(s) (e.g., unlicensed channel(s)). A radio node deploying LBT sets an EDT at which the radio node "hears" traffic from neighboring radio nodes on the shared channel. In other words, if a given radio node detects wireless signals at an energy level exceeding its configured or selected EDT, the channel is determined to be occupied and the radio node waits before communicating over the channel. If the given radio node is configured with a lower EDT, LBT can improve signal quality but also reduce the amount of time the given radio node occupies the shared channel. In contrast, if the given radio node is configured with a higher EDT it can occupy the same channel as a neighboring radio node, increasing the amount of time the given radio node occupies the channel while decreasing signal quality. If the given radio node has a fixed EDT or is otherwise unable to dynamically select and adjust its EDT, a higher or lower EDT may result in reduced throughput under changing conditions.

Thus, in exemplary aspects disclosed herein, uncoordinated radio nodes dynamically adjust an EDT to avoid harmful collisions with neighboring radio nodes or otherwise improve throughput when operating on shared spectrum. A radio node can detect a collision or radio frequency (RF) interference from a neighboring radio node. Once the collision or RF interference is detected, the EDT of the radio node is dynamically adjusted to improve throughput. In some cases, the collision or RF interference can be avoided by calculating a throughput of the radio node while operating on each of a plurality of EDTs and selecting the EDT predicted to result in a higher throughput. In other cases, the EDT may be dynamically adjusted based on an iterative approach which incorporates measurements of the neighboring radio node.

In one exemplary aspect, a method of selecting an EDT for a first radio node deploying listen before talk is provided. The method includes setting a first EDT for the first radio node. The method also includes determining that a collision exists between the first radio node and a second radio node while operating on the first EDT. The method also includes adjusting to a second EDT for the first radio node such that the collision is predicted to be avoided.

An additional embodiment of the disclosure relates to a method of selecting an EDT for an uncoordinated radio node pair including a first radio node deploying listen before talk. The method includes identifying a radio node pair comprising the first radio node and a neighboring second radio node. The method also includes detecting that the neighboring second radio node causes RF interference to the first radio node. The method also includes selecting an EDT for the first radio node to avoid the RF interference.

An additional embodiment of the disclosure relates to a controller circuit. The controller circuit comprises a communication interface circuit configured to detect RF signals over a shared channel. The controller circuit also comprises a processor circuit configured to set a first EDT at which the communication interface circuit hears the RF signals, determine that a collision exists between a first radio node and a second radio node while operating on the first EDT, and adjust to a second EDT such that the collision is predicted to be avoided.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

DETAILED DESCRIPTION

Figure 1:
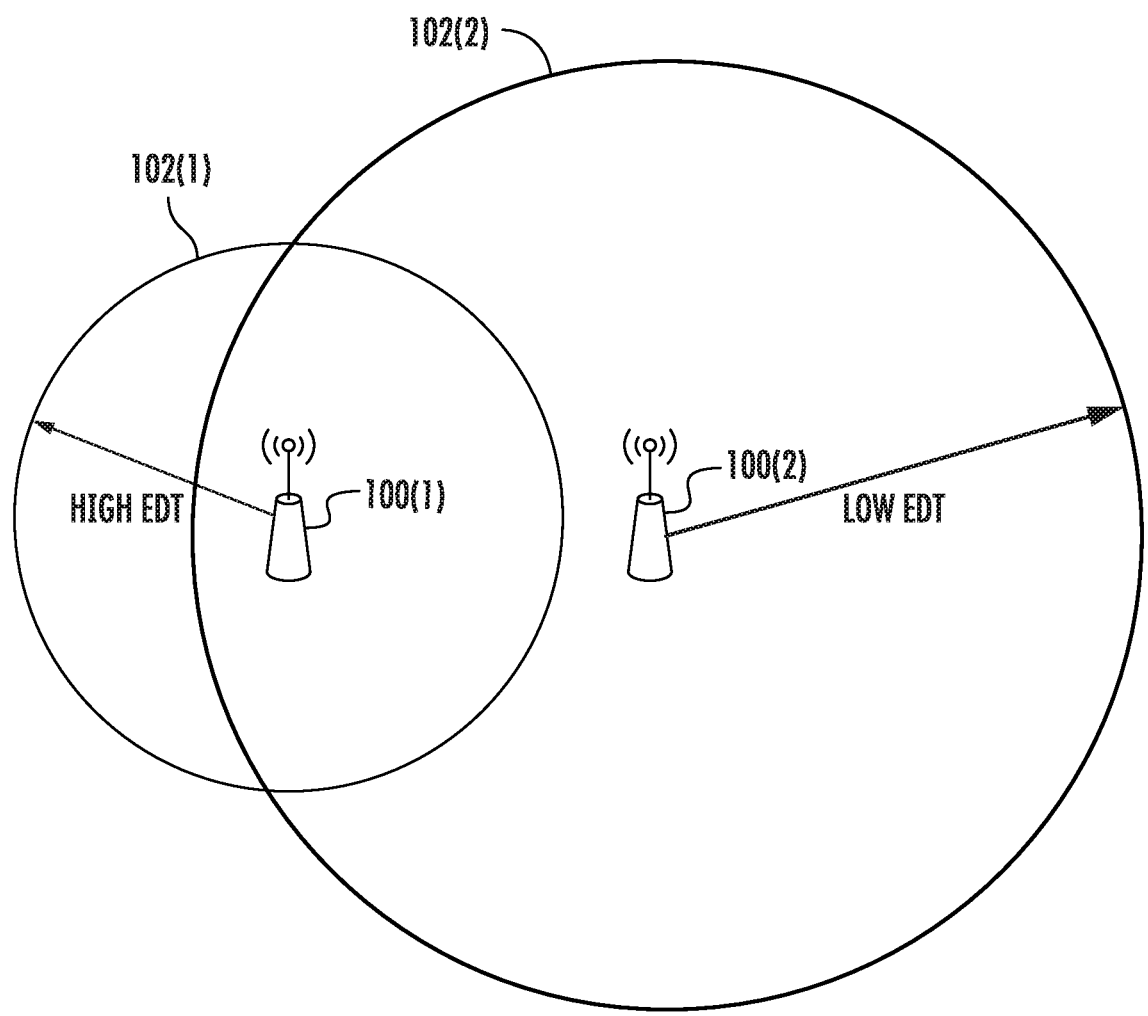
FIG. 1 illustrates two neighboring radio nodes having different energy detection thresholds (EDTs)

Embodiments of the disclosure relate to systems and methods for dynamically selecting and adjusting energy detection thresholds (EDTs) in uncoordinated radio nodes deploying listen before talk to improve throughput on shared spectrum. As an example, the radio nodes may be deployed as individual wireless access points or within distributed communications networks, such as a macrocell radio access network (RAN) (e.g., a traditional cellular base station) and/or a small cell RAN (e.g., a RAN deployed in an enterprise environment). Each radio node may support wireless communications over unlicensed spectrum, shared spectrum, spectrum licensed from a third party, or other spectrum in which access is arbitrated by an external service not under the control of the operator of the radio node. As an example, multiple radio nodes may be deployed within a geographical region, and may further be deployed within multiple RANs or similar networks which have limited or no ability to coordinate access to the shared spectrum. The radio nodes in aspects disclosed herein are configured to deploy mechanisms to avoid or reduce interference issues, including collisions, with use of the shared spectrum (e.g., unlicensed spectrum). One such mechanism is "Listen Before Talk (LBT)," as proposed by the Third Generation Partnership Project (3GPP) for LTE in Unlicensed spectrum (LTE-U) and License Assisted Access (LAA) for minimizing interferences between two transceivers (e.g., radio nodes) operating in the same shared channel(s) (e.g., unlicensed channel(s)). A radio node deploying LBT sets an EDT at which the radio node "hears" traffic from neighboring radio nodes on the shared channel. In other words, if a given radio node detects wireless signals at an energy level exceeding its configured or selected EDT, the channel is determined to be occupied and the radio node waits before communicating over the channel. If the given radio node is configured with a lower EDT, LBT can improve signal quality but also reduce the amount of time the given radio node occupies the shared channel. In contrast, if the given radio node is configured with a higher EDT it can occupy the same channel as a neighboring radio node, increasing the amount of time the given radio node occupies the channel while decreasing signal quality. If the given radio node has a fixed EDT or is otherwise unable to dynamically select and adjust its EDT, a higher or lower EDT may result in reduced throughput under changing conditions.

Thus, in exemplary aspects disclosed herein, uncoordinated radio nodes dynamically adjust an EDT to avoid harmful collisions with neighboring radio nodes or otherwise improve throughput when operating on shared spectrum. A radio node can detect a collision or radio frequency (RF) interference from a neighboring radio node. Once the collision or RF interference is detected, the EDT of the radio node is dynamically adjusted to improve throughput. In some cases, the collision or RF interference can be avoided by calculating a throughput of the radio node while operating on each of a plurality of EDTs and selecting the EDT predicted to result in a higher throughput. In other cases, the EDT may be dynamically adjusted based on an iterative approach which incorporates measurements of the neighboring radio node.

Figure 2:
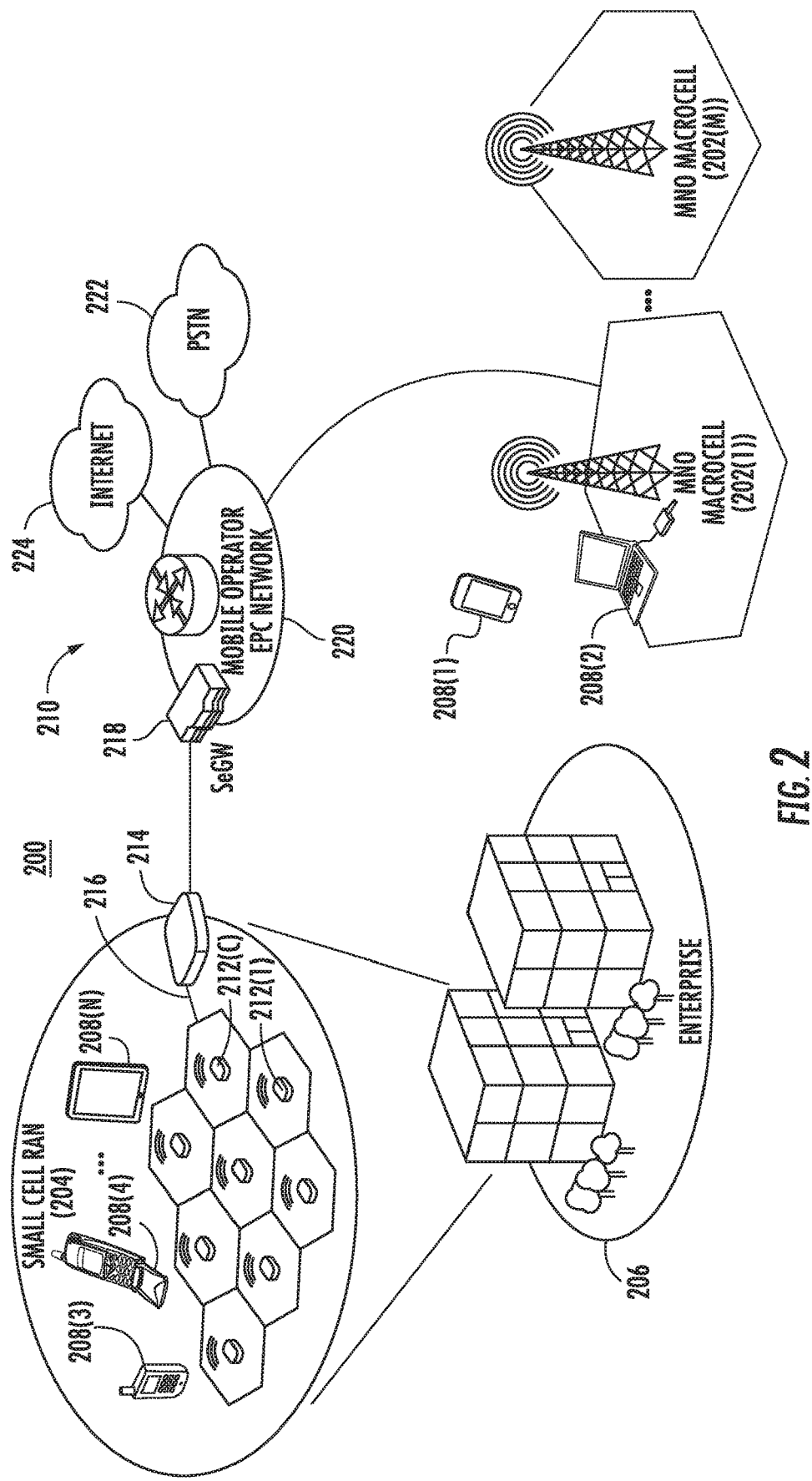
FIG. 2 is a schematic diagram of an exemplary mobile telecommunications environment that includes an exemplary macrocell radio access network (RAN) and an exemplary small cell RAN located within an enterprise environment and configured to service mobile communications between a user mobile communications device to a mobile network operator (MNO), wherein the RANs include radio nodes configured to access a shared radio frequency spectrum and dynamically adjust EDTs to improve throughput.
Figure 3A:
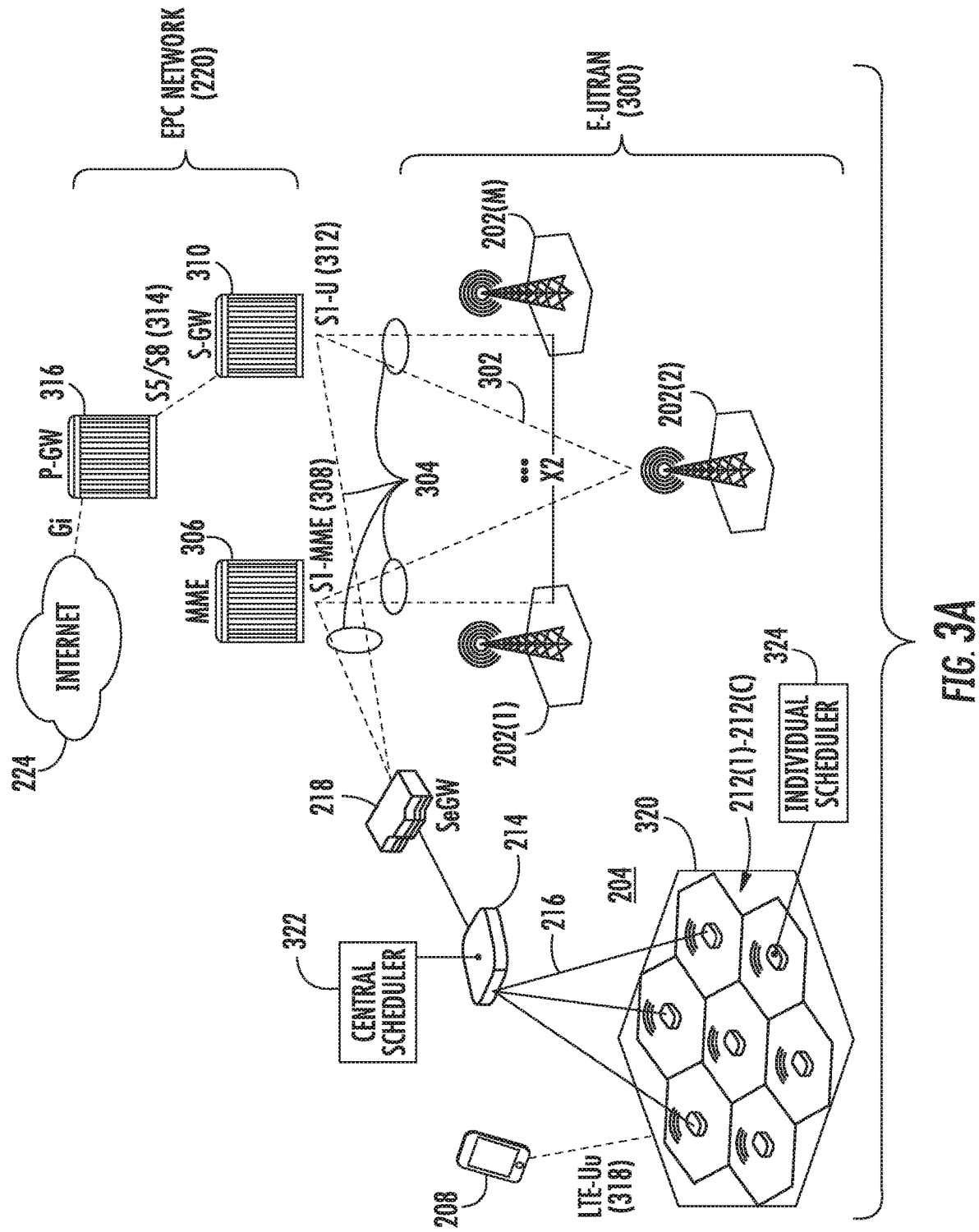
FIGS. 3A and 3B illustrate exemplary details of an evolved packet core (EPC) and Evolved Universal Mobile Telecommunications System (UMTS) Terrestrial Radio Access Network (E-UTRAN) arranged under Long Term Evolution (LTE) for the mobile telecommunications environment in FIG. 2.
Figure 3B:
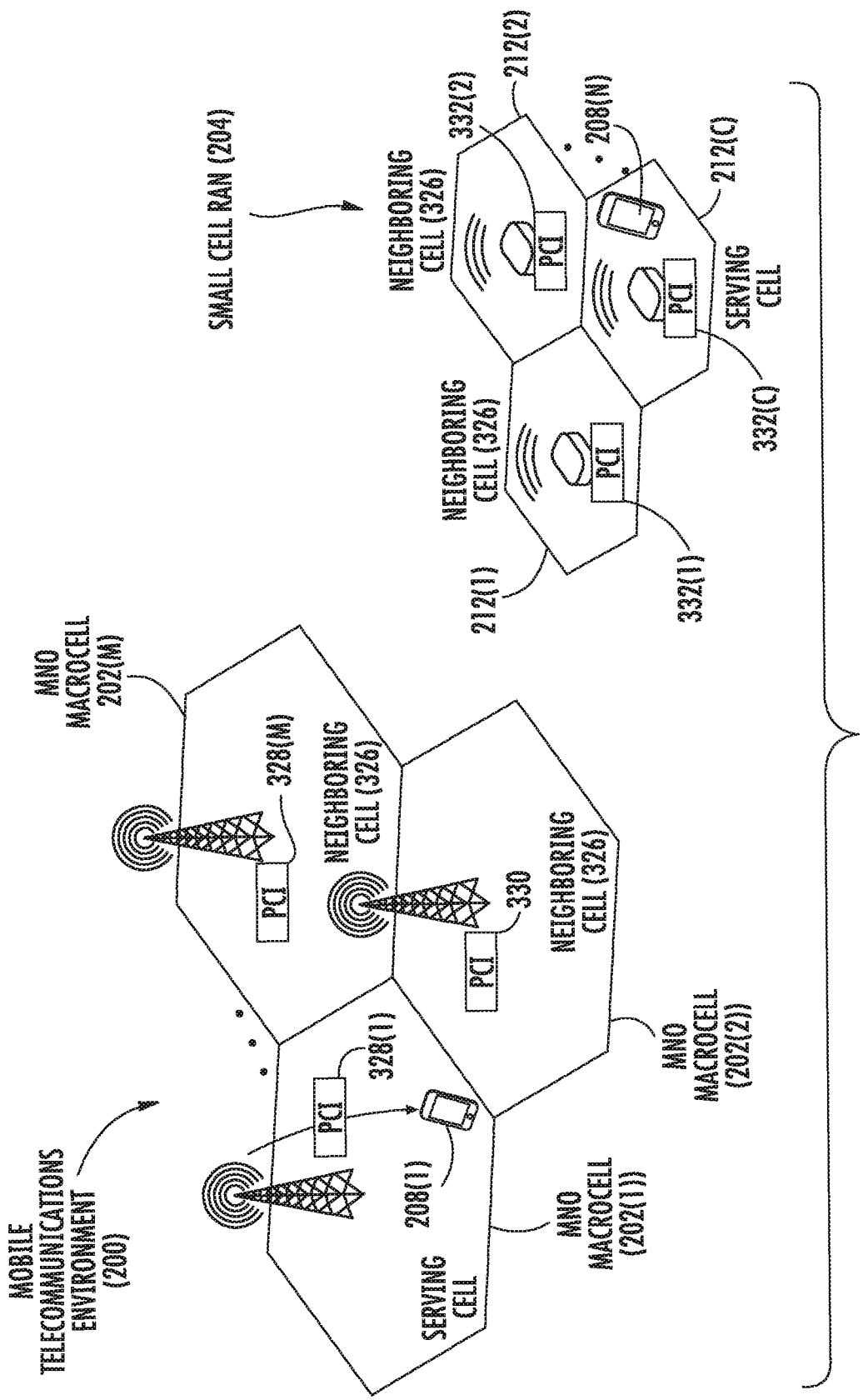

Prior to discussing the above aspects of this disclosure, an exemplary telecommunications environment 200 as depicted in FIGS. 2-3B is described, in which radio nodes deploy listen before talk within a coordinated network to improve throughput on shared spectrum. In this regard, FIG. 2 is a schematic diagram of an exemplary mobile telecommunications environment 200 (also referred to as "environment 200") that includes exemplary macrocell RANs 202(1)-202(M) ("macrocells 202(1)-202(M)") and an exemplary small cell RAN 204 located within an enterprise environment 206 and configured to service mobile communications between a user mobile communications device 208(1)-208(N) to a mobile network operator (MNO) 210. A serving RAN for a user mobile communications device 208(1)-208(N) is a RAN or cell in the RAN in which the user mobile communications device 208(1)-208(N) has an established communications session with the exchange of mobile communications signals for mobile communications. Thus, a serving RAN may also be referred to herein as a serving cell. For example, the user mobile communications devices 208(3)-208(N) in FIG. 2 are being serviced by the small cell RAN 204, whereas user mobile communications devices 208(1), 208(2) are being serviced by the macrocells 202(1)-202(M). The macrocells 202(1)-202(M) are MNO macrocells in this example.

In this regard, with reference to FIG. 2, the mobile telecommunications environment 200 in this example, is arranged as a Long Term Evolution (LTE) system as described by the Third Generation Partnership Project (3GPP) as an evolution of the Global System for Mobile Communication/Universal Mobile Telecommunications System (GSM/UMTS) standards. It is emphasized, however, that the aspects described herein may also be applicable to other network types and protocols. The mobile telecommunications environment 200 includes the enterprise environment 206 in which the small cell RAN 204 is implemented. The small cell RAN 204 includes a plurality of small cell radio nodes 212(1)-212(C). Each small cell radio node 212(1)-212(C) has a radio coverage area (graphically depicted in the drawings as a hexagonal shape) that is commonly termed a "small cell." A small cell may also be referred to as a femtocell, or using terminology defined by 3GPP as a Home Evolved Node B (HeNB). In the description that follows, the term "cell" typically means the combination of a radio node and its radio coverage area unless otherwise indicated.

As discussed above and in more detail below, the EDT of radio nodes (e.g., small cell radio nodes 212(1)-212(C) or macrocells 202(1)-202(M)) can be dynamically selected and/or adjusted to improve throughput of the individual radio nodes and/or of the RAN 202(1)-202(M), 204 as a whole. In particular, at least one radio node in the RAN 202(1)-202(M), 204 can be deployed near another radio node with which it cannot coordinate selecting the EDT. In this regard, a radio node can detect a collision or RF interference from a neighboring radio node, and the EDT of the radio node can be dynamically adjusted to avoid the collision or RF interference, as described further below with respect to FIGS. 5 and 7-9.

The size of the enterprise environment 206 and the number of cells deployed in the small cell RAN 204 may vary. In typical implementations, the enterprise environment 206 can be from 50,000 to 500,000 square feet and encompass multiple floors, and the small cell RAN 204 may support hundreds to thousands of users using mobile communications platforms such as mobile phones, smartphones, tablet computing devices, and the like shown as the user mobile communications devices 208(3)-208(N). However, the foregoing is intended to be illustrative and the solutions described herein can be typically expected to be readily scalable either upwards or downwards as the needs of a particular usage scenario demand.

In reference to FIG. 2, the small cell RAN 204 includes one or more services nodes (represented as a single services node 214 in FIG. 2) that manage and control the small cell radio nodes 212(1)-212(C). In alternative implementations, the management and control functionality may be incorporated into a small cell radio node 212(1)-212(C), distributed among nodes, or implemented remotely (i.e., using infrastructure external to the small cell RAN 204). The small cell radio nodes 212(1)-212(C) are coupled to the services node 214 over a direct or local area network (LAN) connection 216 as an example, typically using secure IPsec tunnels. The services node 214 aggregates voice and data traffic from the small cell radio nodes 212(1)-212(C) and provides connectivity over an internet protocol security (IPsec) tunnel to a security gateway (SeGW) 218 in an Evolved Packet Core (EPC) 220 network of the MNO 210. The EPC 220 is typically configured to communicate with a public switched telephone network (PSTN) 222 to carry circuit-switched traffic, as well as for communicating with an external packet-switched network such as the Internet 224.

Some or all of the macrocells 202(1)-202(M) can also be an Evolved Node B (eNB) base station. The radio coverage area of a macrocell 202(1)-202(M) is typically much larger than that of a small cell where the extent of coverage often depends on the base station configuration and surrounding geography. Thus, a given user mobile communications device 208(3)-208(N) in the small cell RAN 204 may achieve connectivity to the EPC network 220 through either a macrocell 202(1)-202(M) or small cell radio node 212(1)-212(C) in the small cell RAN 204 in the environment 200.

FIGS. 3A and 3B illustrate exemplary details of an EPC and Evolved UMTS Terrestrial Radio Access Network (E-UTRAN) arranged under LTE for the mobile telecommunications environment 200 in FIG. 2. Along with the macrocells 202(1)-202(M), the small cell RAN 204 forms an access network (i.e., an E-UTRAN) under 3GPP as represented by reference numeral 300 in FIG. 3A. As shown in FIG. 3A, there is no centralized controller in the E-UTRAN 300, hence an LTE network architecture is commonly said to be "flat." Macrocells 202(1)-202(M) are typically interconnected using an X2 interface 302. In some cases, small cell radio nodes 212(1)-212(C) and/or macrocells 202(1)-202(M) may be interconnected with radio nodes in other networks using an X2 interface 302. The macrocells 202(1)-202(M) are also typically connected to the EPC network 220 by means of an S1 interface 304. More particularly, the macrocells 202(1)-202(M) are connected to a Mobility Management Entity (MME) 306 in the EPC network 220 using an S1-MME interface 308, and to a Serving Gateway (S-GW) 310 using an S1-U interface 312. An S5/S8 interface 314 couples the S-GW 310 to a Packet Data Network Gateway (P-GW) 316 in the EPC network 220 to provide the user mobile communications device 208 with connectivity to the Internet 224. A user mobile communications device 208 can connect to the small cell radio nodes 212(1)-212(C) in the small cell RAN 204 over an LTE-Uu interface 318.

The S1-MME interface 308 is also connected to the MME 306 and S-GW 310 in the EPC network 220 using the appropriate S1 interface connections 304. Accordingly, as each of the small cell radio nodes 212(1)-212(C) in the small cell RAN 204 is operatively coupled to the services node 214 over the LAN connection 216, the communications connections from the small cell radio nodes 212(1)-212(C) are aggregated to the EPC network 220. Such aggregation preserves the flat characteristics of the LTE network while reducing the number of S1 interface connections 304 that would otherwise be presented to the EPC network 220. Thus, the small cell RAN 204 essentially appears as a single eNB 320 to the EPC network 220, as shown. The services node 214 in the small cell RAN 204 includes a central scheduler 322. The small cell radio nodes 212(1)-212(C) may also be configured to support individual schedulers 324.

A user mobile communications device 208 connected to the environment 200 will actively or passively monitor a cell in a macrocell 202(1)-202(M) in the E-UTRAN 300 in the communications range of the user mobile communications device 208 as the user mobile communications device 208 moves throughout the environment 200. As shown in FIG. 3B, such a cell is termed the "serving cell." For example, if a user mobile communications device 208(1)-208(N) is in communication through an established communications session with a particular small cell radio node 212(1)-212(C) in the small cell RAN 204, the particular small cell radio node 212(1)-212(C) will be the serving cell to the user mobile communications device 208(1)-208(N), and the small cell RAN 204 will be the serving RAN. The user mobile communications device 208(1)-208(N) will continually evaluate the quality of a serving cell as compared with that of a neighboring cell 326 in the small cell RAN 204 and/or the macrocells 202(1)-202(M), as shown in FIG. 3B. A neighboring cell 326 is a cell among the small cell RAN 204 and/or macrocells 202(1)-202(M), that is not in control of the active communications session for a given user mobile communications device 208(1)-208(N), but is located in proximity to a serving cell to a user mobile communications device 208(1)-208(N) such that the user mobile communications device 208(1)-208(N) could be in communications range of both its serving cell and the neighboring cell 326. Both small cell radio nodes 212(1)-212(C) and the macrocells 202(1)-202(M) can identify themselves to a user mobile communications device 208(1)-208(N) using a respective unique Physical Cell Identity (PCI) 328(1)-328(M), 330, 332(1)-332(C) (e.g., a public land mobile network (PLMN) identification (ID) (PLMN ID)) that is transmitted over a downlink user mobile communications device 208(1)-208(N). Each of the small cell radio nodes 212(1)-212(C) and the macrocells 202(1)-202(M) can assign a physical channel identity (PCI) that allows user mobile communications device 208(1)-208(N) to distinguish adjacent cells. As such, the PCIs 328(1)-328(M), 330, 332(1)-332(C) are uniquely assigned among neighboring cells 326, but can be reused across geographically separated cells.

In this regard, aspects disclosed herein include the ability of radio nodes (e.g., small cell radio nodes 212(1)-212(C) or macrocells 202(1)-202(M)) to dynamically select and/or adjust an operating EDT to improve throughput of the radio nodes and/or of the RAN 202(1)-202(M), 204. In an exemplary aspect, one or more of the small cell radio nodes 212(1)-212(C) or radio nodes in the macrocells 202(1)-202 (M) (or another network entity, such as the services node 214) can detect a collision or RF interference with an adjacent radio node, as depicted in FIGS. 4A-6. In a first aspect, the collision or RF interference can be avoided by calculating a throughput of the radio node while operating on each of a plurality of EDTs and selecting the EDT predicted to result in a higher throughput, as described with respect to FIGS. 5 and 6. In another aspect, the EDT may be dynamically adjusted based on an iterative approach which incorporates measurements of the neighboring radio node, as depicted in FIGS. 5 and 7-9.

Figure 4B:
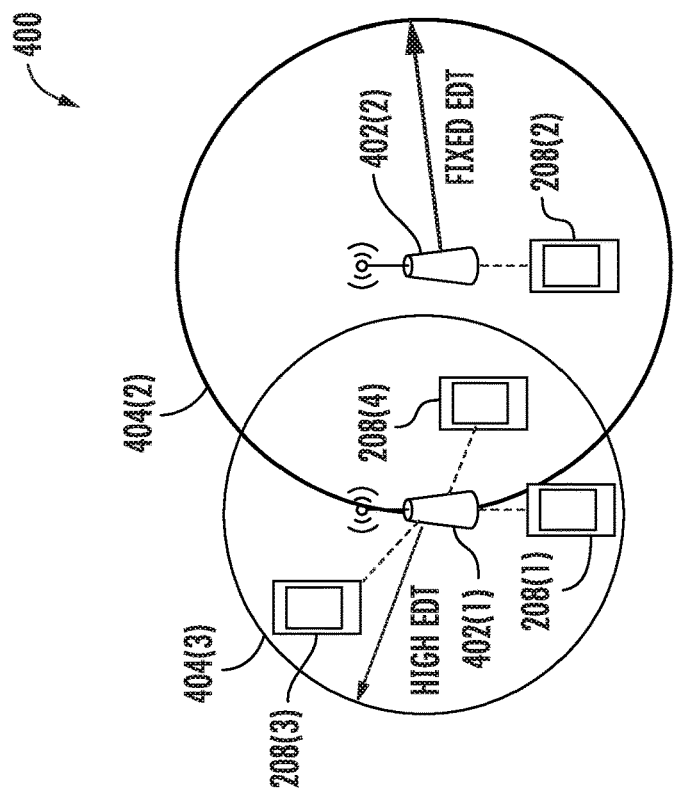
FIG. 4B is a schematic diagram of the exemplary uncoordinated radio node pair of FIG. 4A in which the first radio node has a higher operating EDT.
Figure 4A:
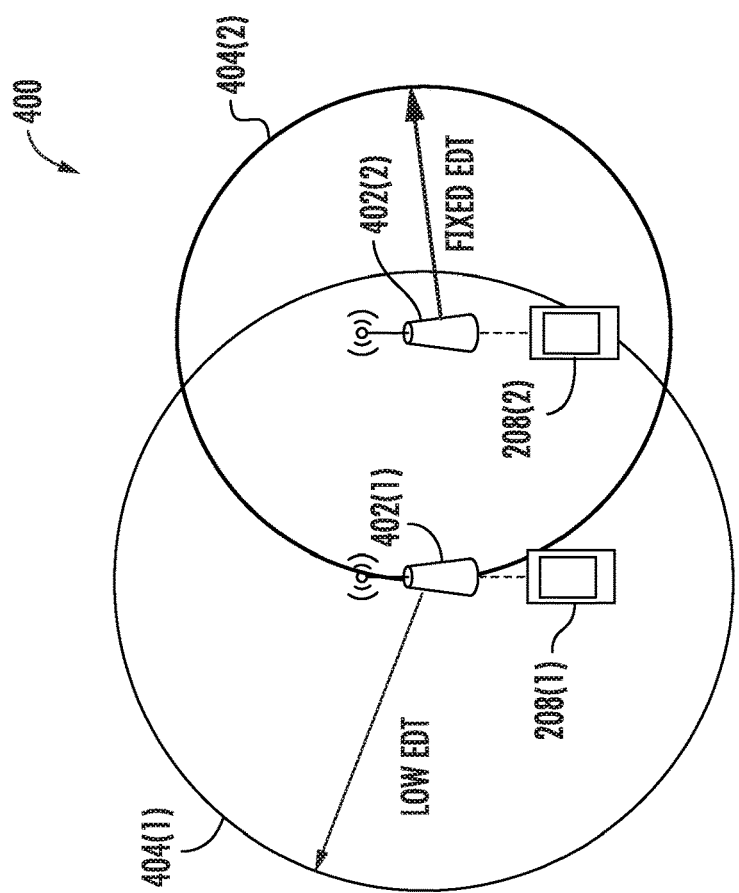
FIG. 4A is a schematic diagram of an exemplary uncoordinated radio node pair including a first radio node configured to deploy telecommunications services to a user mobile telecommunications device and having a lower operating EDT.

In this regard, with reference to FIGS. 4A and 4B, an uncoordinated radio node pair 400 includes a first radio node 402(1), which is configured to dynamically adjust its EDT to improve or maximize throughput, and a second, neighboring radio node 402(2), which can be assumed to have a fixed EDT. FIG. 4A is a schematic diagram of an exemplary uncoordinated radio node pair 400 including a first radio node 402(1) configured to deploy telecommunications services to a user mobile telecommunications device and having a lower operating EDT. FIG. 4B is a schematic diagram of the exemplary uncoordinated radio node pair 400 of FIG. 4A in which the first radio node 402(1) has a higher operating EDT. The first radio node 402(1) may be deployed in a network of radio nodes, such as the small cell RAN 204 or the macrocell RANs 202(1)-202(M) depicted in FIGS. 2-3B. The second radio node 402(2) can be deployed in a different network or otherwise has a limited or no ability to communicate with the first radio node 402(1) to coordinate setting or adjusting EDTs. The first radio node 402(1) can deploy telecommunications services to a first user mobile communications device 208(1), and the second radio node 402(2) can deploy telecommunications services to a second user mobile communications device 208(2).

The first radio node 402(1) can be configured to increase its wireless throughput by accessing additional wireless spectrum to the licensed spectrum of its serving MNO. Examples of such additional wireless spectrum include unlicensed spectrum, shared spectrum, spectrum licensed from a third party, spectrum associated with citizens broadband radio service (CBRS), and so on, referred to herein as shared spectrum. When accessing the shared spectrum, spectrum allocation or channel allocation may be performed by a technique or procedures that occur independently or semi-independently of the MNO (e.g., by a spectrum access system (SAS)). In this regard, the first radio node 402(1) can operate in the same wireless channel (e.g., a shared channel) with the neighboring second radio node 402(2), which can result in collisions, or instances in which the neighboring radio nodes 402(1), 402(2) communicate at a same time, causing RF interference which impairs wireless communications and/or throughput of the first radio node 402(1).

Accordingly, the first radio node 402(1) and/or a network device in communication with the first radio node 402(1) (e.g., the services node 214 of FIGS. 2-3B) can deploy mechanisms to avoid or reduce RF interference issues, including collisions, such as LBT. LBT may be deployed in accordance with one or more wireless communications standards, such as LTE-U and/or LAA as proposed by 3GPP. Because the first radio node 402(1) deploys LBT, it sets an EDT at which the first radio node 402(1) "hears" (e.g., responds to) traffic on the shared channel. For example, the first radio node 402(1) hears, or responds to, radio signals from the second radio node 402(2) received at an energy level which exceeds the EDT.

FIG. 4A represents the magnitude of a lower EDT of the first radio node 402(1) through a large listening range 404(1) and a fixed EDT of the second radio node 402(2) through a fixed listening range 404(2). Accordingly, when the first radio node 402(1) has a defined low EDT, it is more likely to detect radio signals which originate from further away, resulting in the large listening range 404(1). Because the second radio node 402(2) is within the large listening range 404(1), the first radio node 402(1) can hear the second radio node 402(2), and will determine that the shared channel is occupied when the second radio node 402(2) is transmitting. Due to the deployment of LBT, the first radio node 402(1) will not transmit at a same time as the second radio node 402(2) on a same wireless channel (e.g., the shared channel), which can improve signal quality by reducing collisions or other RF interference.

In contrast, FIG. 4B depicts the first radio node 402(1) having a higher EDT indicated by a small listening range 404(3), while the second radio node 402(2) has the same fixed EDT indicated by the same fixed listening range 404(2). Accordingly, when the first radio node 402(1) has a defined high EDT, it is less likely to detect radio signals which originate from further away, resulting in the small listening range 404(3). Because the second radio node 402(2) is outside the small listening range 404(3), the first radio node 402(1) cannot hear the second radio node 402(2) (e.g., does not respond to signals from the second radio node 402(2)), and will determine that the shared channel is available and may transmit when the second radio node 402(2) is transmitting. Under LBT, the first radio node 402(1) and the second radio node 402(2) may at times transmit at a same time on a same channel (e.g., the shared channel), which can increase channel occupancy, but the first radio node 402(1) may experience reduced signal quality due to increased collisions or other RF interference.

For illustrative purposes, FIGS. 4A and 4B depict the second radio node 402(2) with a fixed listening range 404(2), which is smaller than the large listening range 404(1) of the first radio node 402(1) operating on a lower EDT and larger than the small listening range 404(3) of the first radio node 402(1) operating on a higher EDT. In other examples however, the fixed listening range 404(2) may be larger or smaller due to a respectively lower or higher EDT. In addition, the second radio node 402(2) is described as having a fixed EDT and a fixed listening range 404(2), but the EDT of the second radio node 402(2) may vary. However, the EDT of the second radio node 402(2) generally is not controlled or influenced by the EDT selection process (described further below with respect to FIGS. 5-10) for the first radio node 402(1), and is therefore assumed to have a fixed EDT. In exemplary aspects herein, the EDT selection process described below is applied in an iterative or periodic manner, such that if the second radio node 402(2) changes its EDT or the environment of the uncoordinated radio node pair 400 otherwise changes, the first radio node 402(1) can dynamically adjust its EDT to improve throughput again.

In an exemplary aspect disclosed herein, the first radio node 402(1) can identify the uncoordinated radio node pair 400 with the second radio node 402(2) and wireless throughput can be calculated for each of multiple EDT magnitudes. In another exemplary aspect, the first radio node 402(1) can detect collisions from the second radio node 402(2) and apply an iterative process to optimize its operational EDT to improve throughput. In this regard, the optimal operational EDT can depend on a number of factors. As a first non-limiting example, the first radio node 402(1) can be in communication with only a third user mobile communications device 208(3), while the second radio node 402(1) is in communication with only the second user mobile communications device 208(2). Due to the relative positions of the user mobile communications devices 208(2), 208(3) and the radio nodes 402(1), 402(2), the first radio node 402(1) and/or the third user mobile communications device 208(3) can experience a lower signal-to-interference-plus-noise ratio (SINR) when the second radio node 402(2) communicates with the second user mobile communications device 208(2). The SINR here can be defined as a power of a signal between the first radio node 402(1) and the third user mobile communications device 208(3) divided by the sum of an interference power from interfering signals between the second radio node 402(2) and the second user mobile communications device 208(2) plus the power of background noise on the wireless channel. The lower SINR may enable the first radio node 402(1) to share a wireless channel while maintaining higher throughput (e.g., due to a higher modulation rate, a lower transmission error rate, and so on). Thus, it may improve throughput to set the first radio node 402(1) to operate with a higher EDT (resulting in the small listening range 404(3)).

As a second non-limiting example, the first radio node 402(1) can be in communication with the first user mobile communications device 208(1), the third user mobile communications device 208(3), and a fourth user mobile communications device 208(4), while the second radio node 402(2) is in communication with the second user mobile communications device 208(2), depicted in FIG. 4B. Due to the relative positions of the user mobile communications devices 208(2)-208(4) and the radio nodes 402(1), 402(2), the first radio node 402(1) and/or the fourth user mobile communications device 208(4) can experience a higher SINR when the second radio node 402(2) communicates with the second user mobile communications device 208(2). The higher SINR may cause the first radio node 402(1) to have a reduced throughput (e.g., due to a lower modulation rate, a higher transmission error rate, and so on) when sharing a wireless channel with the second radio node 402(2). Thus, it may improve throughput to set the first radio node 402(1) to operate with a lower EDT (resulting in the large listening range 404(1)) to avoid collisions between the first radio node 402(1) and the second radio node 402(2). In this regard, the EDT of the first radio node 402(1) can be dynamically selected and/or adjusted after calculating an expected throughput while operating on multiple EDTs or through an iterative process to optimize its operational EDT.

Figure 5:
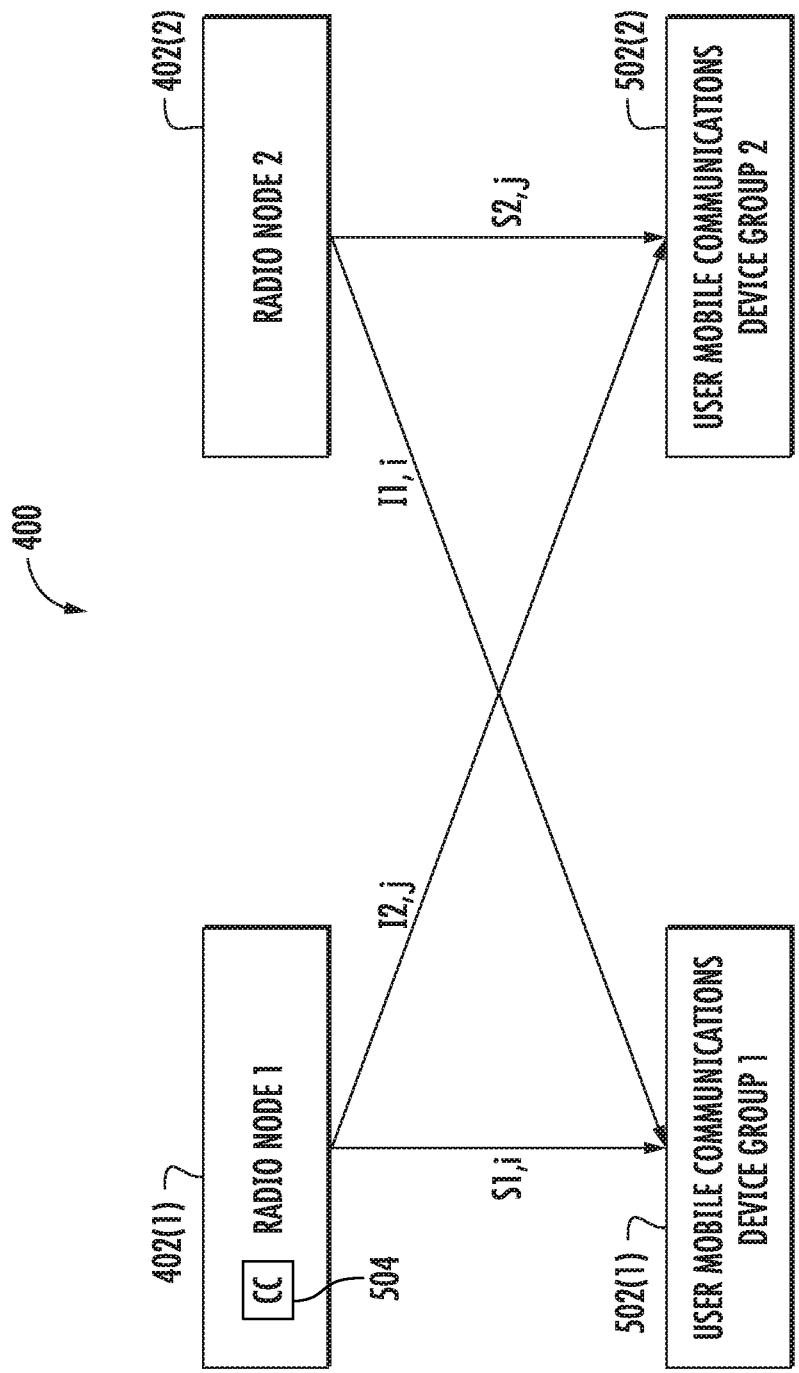
FIG. 5 is a schematic diagram of the exemplary uncoordinated radio node pair of FIG. 4A having a first radio node and a second radio node, wherein the first radio node deploys listen before talk to improve throughput on shared spectrum.

FIG. 5 is a schematic diagram of the exemplary uncoordinated radio node pair 400 of FIG. 4A having a first radio node 402(1) and a second radio node 402(2), wherein the first radio node 402(1) deploys listen before talk to improve throughput on shared spectrum. The first radio node 402(1) can be in a network of radio nodes, such as the small cell RAN 204 or the macrocell RANs 202(1)-202(M) depicted in FIGS. 2-3B. The second radio node 402(2) can be deployed in a different network or otherwise has a limited or no ability to communicate with the first radio node 402(1) to coordinate setting or adjusting EDTs. The first radio node 402(1) can identify uncoordinated radio node pairs 400 with the second radio node 402(2) and additional radio nodes in order to facilitate dynamically setting the EDT of the first radio node 402(1) to increase throughput. The identification of uncoordinated radio node pairs 400 is illustrated further in FIG. 6.

The first radio node 402(1) is configured to service mobile communications services between a first user mobile communications device group 502(1) to an MNO, such as the MNO 210 depicted in FIG. 2. As represented in FIG. 5, when the first radio node 402(1) is transmitting, one or more devices in the first user mobile communications device group 502(1) receive signal power $S1,i$, representing received signal power from the first radio node 402(1) at an $i^{th}$ device in the first user mobile communications device group 502(1). If the second radio node 402(2) is transmitting at a same time, the one or more devices in the first user mobile communications device group 502(1) receive interference power $I1,i$, representing received interference power from the second radio node 402(2) at the $i^{th}$ device in the first user mobile communications device group 502(1). The received signal power $S1,i$ (e.g., a first signal parameter) and received interference power (e.g., a first interference parameter) $I1,i$ can be measured at the one or more devices in the first user mobile communications device group 502(1) and reported to the first radio node 402(1). In some examples, the one or more devices in the first user mobile communications device group 502(1) can measure and report a first noise parameter, such as noise power, to the first radio node 402(1). In other examples, a first signal-to-noise ratio (SNR) and/or first SINR can be reported to the first radio node 402(1). The SINR here can be defined as a received signal power (e.g., $S1,i$) divided by the sum of an interference power (e.g., $I1,i$) plus the power of background noise on the wireless channel. The SNR here can be defined as a received signal power (e.g., $S1,i$) divided by the power of background noise on the wireless channel.

Similarly, the second radio node 402(2) is configured to service wireless communications services between a second user mobile communications device group 502(2) and another network (or in the same network as the first radio node 402(1) without the ability to coordinate selection of EDTs). When the second radio node 402(2) is transmitting, one or more devices in the second user mobile communications device group 502(2) receive signal power $S2,j$, representing received signal power from the second radio node 402(2) at a $j^{th}$ device in the second user mobile communications device group 502(2). If the first radio node 402(1) is transmitting at a same time, the one or more devices in the second user mobile communications device group 502(2) receive interference power $I2,j$, representing received interference power from the first radio node 402(1) at the $j^{th}$ device in the second user mobile communications device group 502(2). The received signal power $S2,j$ (e.g., a second signal parameter) and received interference power $I2,j$ (e.g., a second interference parameter) can be measured at the one or more devices in the second user mobile communications device group 502(2) and reported to the second radio node 402(2). In some examples, the one or more devices in the second user mobile communications device group 502(2) can measure and report a second noise parameter, such as noise power, to the second radio node 402(2). In other examples, a second SNR and/or second SINR can be reported to the first radio node 402(1).

First Approach—Calculation

In a first exemplary aspect, once the uncoordinated radio node pair 400 has been identified, a throughput calculation algorithm is applied to calculate a throughput for the uncoordinated radio node pair 400 for setting the first radio node 402(1) to each of multiple EDTs. In an exemplary aspect, a controller circuit 504 dynamically selects EDTs based on applying the throughput calculation algorithm to the uncoordinated radio node pair 400. The controller circuit 504 can include a communication interface circuit, a processor circuit, and other components such as described below with respect to FIG. 11. In an exemplary aspect, the controller circuit 504 comprises or is included within the first radio node 402(1). In other examples, the controller circuit 504 can be coupled to the first radio node 402(1) and may comprise or be included within a central scheduler (e.g., central scheduler 322 of FIG. 3A), a services node (e.g., services node 214 of FIGS. 2-3B), or another network entity.

As a non-limiting example of the multiple EDTs, a first throughput is calculated for a first EDT (e.g., a defined high EDT), which may be based on an EDT limit (e.g., a maximum allowed EDT) under 3GPP's LAA and/or another wireless communication standard. A second throughput is calculated for a second EDT (e.g., a defined low EDT), which is less than the first EDT, and may be an EDT at which the first radio node 402(1) can hear the second radio node 402(2), such as the highest EDT at which the first radio node 402(1) can hear the second radio node 402(2) or an amount below that (e.g., 10 decibels (dB) or decibel-milliwatts (dBm)). The second EDT may be based on a reference signal received power (RSRP) and/or a received strength signal indicator (RSSI) (e.g., RSRP and/or RSSI as defined under 3GPP's LTE or other standards) measured by the first radio node 402(1) and/or one or more devices in the first user mobile communications device group 502(1). For example, the first radio node 402(1) can measure or receive an RSRP or RSSI of the second radio node 402(2) and/or the second user mobile communications device group 502(2). The second EDT can be based on the minimum RSRP or RSSI measurement between the first radio node 402(1) and the second radio node 402(2). For example, the second EDT can be 10 dB or 10 dBm below the RSRP or RSSI measured for the second radio node 402(2). In some cases, the first radio node 402(1) can identify an uncoordinated radio node pair 400 with more than one other radio node, and can measure an RSRP or RSSI for each of the multiple radio nodes with which it identifies a uncoordinated radio node pair 400. The second EDT (e.g., the defined low EDT) can be implemented based on the minimum of all the RSRP or RSSI measurements for the multiple radio nodes (e.g., 10 dB or 10 dBm below the minimum RSRP or RSSI measurement).

In the non-limiting example of the first EDT and the second EDT, the first EDT is a higher EDT, such as an EDT based on the EDT limit under LAA, at which the first radio node 402(1) may not hear the second radio node 402(2). The second EDT is a lower EDT, at which the first radio node 402(1) can hear the second radio node 402(2). Accordingly, the controller circuit 504 (e.g., via a processor circuit) calculates a first throughput as a function of an SINR when the first radio node 402(1) operates on the first EDT due to the RF interference when the first radio node 402(1) and the second radio node 402(2) transmit at a same time. The controller circuit 504 also calculates a second throughput as a function of an SNR when the first radio node 402(1) operates on the second EDT, as the first radio node 402(1) and the second radio node 402(2) do not transmit at a same time. The controller circuit 504 selects the EDT calculated to have the higher throughput for the first radio node 402(1), and generally sets the selected EDT as the operating EDT for the first radio node 402(1).

Prior to calculating the throughput for the first radio node 402(1) operating on the different EDTs, the controller circuit 504 in first radio node 402(1) (or another network entity, such as the services node 214) may determine whether the second radio node 402(2) can hear the first radio node 402(1), such as by estimating, assuming, or otherwise determining the EDT of the second radio node 402(2). In a first non-limiting example, the first radio node 402(1) can operate under a rule, such as to always assume the second radio node 402(2) operates on a higher EDT (or conversely, a lower EDT) if the EDT is unknown. In another example, the first radio node 402(1) can determine the EDT of the second radio node 402(2) by observing whether it does not occupy the shared channel when the first radio node 402(1) has begun to transmit or by analyzing an occupancy rate of the second radio node 402(2) (e.g., by decoding Wi-Fi packets from the second radio node 402(2) or assessing average energy levels of the second radio node 402(2) over a period of time). Once the first radio node 402(1) (or another network entity, such as the services node 214) has determined whether the second radio node 402(2) can hear the first radio node 402(1), it may further assume that the second radio node 402(2) has a fixed EDT for the purposes of calculating throughput.

In this regard, if the second radio node 402(2) cannot hear the first radio node 402(1), the first EDT (e.g., the defined high EDT) can be calculated according to the following equation:

$$p_{\alpha_1} p_{\alpha_2} f_1\left(\frac{S_1}{I_1 + N}\right) + p_{\alpha_1}(1 - p_{\alpha_2}) f_1\left(\frac{S_1}{N}\right) \quad \text{Eq. 1}$$

If the second radio node 402(2) can hear the first radio node 402(1), the first EDT can be calculated according to the following equation:

$$p_{\alpha_1} f_1\left(\frac{S_1}{N}\right) \quad \text{Eq. 2}$$

The second EDT (e.g., the defined low EDT) can be calculated according to the following equation, whether or not the second radio node 402(2) can hear the first radio node 402(1):

$$\gamma_1(\alpha_1, \alpha_2) f_1\left(\frac{S_1}{N}\right) \quad \text{Eq. 3}$$

Under this approach, $\alpha_1$ represents the arrival rate of the first radio node 402(1), and $\alpha_2$ represents the arrival rate of the second radio node 402(2). The probability of the first radio node 402(1) transmitting is represented by $p_{\alpha_1}$ in Equations 1 and 2 and can be derived from $\alpha_1$. The probability of the second radio node 402(2) transmitting is represented by $p_{\alpha_2}$ and can be derived from $\alpha_2$. The function $f_1$ computes the throughput for the first radio node 402(1) based on the SINR or SNR when the first radio node 402(1) operates on the respective EDT. The function $\gamma_1(\alpha_1, \alpha_2)$ in Equation 3 computes the probability of the first radio node 402(1) transmitting based on the arrival rate $\alpha_1$ of the first radio node 402(1) and the arrival rate $\alpha_2$ of the second radio node 402(2). The function $\gamma_1(\alpha_1, \alpha_2)$ can be modeled as described in Rafael Laufer and Leonard Kleinrock, "The Capacity of Wireless CSMA/CA Networks," IEEE/ACM Transactions On Networking, June 2015, which is incorporated herein by reference in its entirety.

According to Equations 1-3 given above, if the second radio node 402(2) cannot hear the first radio node 402(1), the first throughput of the first radio node 402(1) operating on the first EDT (e.g., the defined high EDT) is calculated (e.g., by a processor circuit in the controller circuit 504) as a first probability of the first radio node 402(1) and the second radio node 402(2) transmitting at a same time $(p_{\alpha_1} p_{\alpha_2})$ multiplied by a first function of a first SINR (which may be based on a first signal parameter $S_1$, a first interference parameter $I_1$, and a noise parameter N, which may be a first noise parameter) when the first radio node 402(1) operates on the first EDT $$\left(f_1\left(\frac{S_1}{I_1+N}\right)\right),$$

plus a second probability of the first radio node 402(1) transmitting without the second radio node 402(2) transmitting $p_{\alpha_1}(1-p_{\alpha_2})$ multiplied by a third function of a first SNR (which may be based on the first signal parameter $S_1$ and the first noise parameter N) when the first radio node 402(1) operates on the first EDT $$f_1\left(\frac{S_1}{N}\right).$$

If the second radio node 402(2) can hear the first radio node 402(1), the first throughput of the first radio node 402(1) operating on the first EDT is calculated (e.g., by a processor circuit in the controller circuit 504) as a third probability of the first radio node 402(1) transmitting $(p_{\alpha_1})$ multiplied by the third function of the first SNR when the first radio node 402(1) operates on the first EDT $$\left(f_1\left(\frac{S_1}{N}\right)\right).$$

The second throughput of the first radio node 402(1) operating on the second EDT (e.g., the defined low EDT) is calculated (e.g., by a processor circuit in the controller circuit 504) as the fourth probability of the first radio node 402(1) transmitting under LBT $(\gamma_1(\alpha_1, \alpha_2))$ multiplied by a second function of the first SNR when the first radio node 402(1) operates on the second EDT $$\left(f_1\left(\frac{S_1}{N}\right)\right).$$

In this regard, the arrival rate $\alpha_1$ of the first radio node 402(1) can be estimated based on a buffer size used by a device in the first user mobile communications device group 502(1) normalized by a total buffer size assigned from the first radio node 402(1). In the uncoordinated radio node pair 400, the first radio node 402(1) generally cannot receive the arrival rate $\alpha_2$ or the probability of the second radio node 402(2) transmitting $P_{\alpha_2}$ directly. However, the probability of the second radio node 402(2) transmitting $P_{\alpha_2}$ can be estimated, modeled, or otherwise based on a Wi-Fi medium utilization (MU) scan or a frequency scan detecting energy in the shared channel, as measured by the first radio node 402(1). The first signal parameter $S_1$ can be the received signal power $S1,i$ from the first radio node 402(1) at the $i^{th}$ device in the first user mobile communications device group 502(1), which can be estimated, modeled, or otherwise based on an RSRP measured by the $i^{th}$ device. The first interference parameter $I_1$ can be the received interference power $I1,i$ from the second radio node 402(2) at the $i^{th}$ device in the first user mobile communications device group 502(1), and can be estimated, modeled, or otherwise based on RSRP or RSSI measurements made by the $i^{th}$ device in the first user mobile communications device group 502(1) and/or the first radio node 402(1).

The above example of the throughput calculation algorithm has been described with respect to the first throughput for the first EDT (e.g., the defined high EDT) and the second throughput for the second EDT (e.g., the defined low EDT). It should be understood that in other examples the controller circuit 504 can apply the throughput calculation algorithm to calculate additional throughputs for additional EDTs, such as another throughput for a third EDT (e.g., an EDT lower than the first EDT, which may be higher or lower than the second EDT). After the throughput calculation algorithm has been applied, the EDT with the higher throughput can be selected for the first radio node 402(1).

In addition, while the above examples have been described with respect to an uncoordinated radio node pair 400, in some examples the first radio node 402(1) and the second radio node 402(2) can coordinate EDTs. The first radio node 402(1) and the second radio node 402(2) can be interconnected by an X2 or similar interface, in which case throughput may be increased or maximized for the coordinated radio node pair of the first radio node 402(1) and the second radio node 402(2). In this example of a coordinated radio node pair, the first EDT can be calculated according to the following equation:

$$p_{\alpha_1} p_{\alpha_2}\left[f_1\left(\frac{S_1}{I_1+N}\right)+f_2\left(\frac{S_2}{I_2+N}\right)\right]+ \\ p_{\alpha_1}(1-p_{\alpha_2})f_1\left(\frac{S_1}{N}\right)+(1-p_{\alpha_1})p_{\alpha_2}f_2\left(\frac{S_2}{N}\right) \quad \text{Eq. 4}$$

The second EDT can be calculated according to the following equation:

$$\gamma_1(\alpha_1, \alpha_2)f_1\left(\frac{S_1}{N}\right)+\gamma_2(\alpha_1, \alpha_2)f_2\left(\frac{S_2}{N}\right) \quad \text{Eq. 5}$$

Under this approach, the function $f_2$ computes the throughput for the second radio node 402(2) based on the SINR or SNR when the second radio node 402(2) operates on the respective EDT. The function $\gamma_2(\alpha_1, \alpha_2)$ in Equation 5 computes the probability of the second radio node 402(2) transmitting based on the arrival rate $\alpha_1$ of the first radio node 402(1) and the arrival rate $\alpha_2$ of the second radio node 402(2), which can be modeled similar to the function $\gamma_1(\alpha_1, \alpha_2)$.

In the example of the coordinated radio node pair, the first radio node 402(1) and the second radio node 402(2) can exchange SINR or SNR parameters for the algorithm (e.g., arrival rates $\alpha_1$, $\alpha_2$, transmission probabilities $p_{\alpha_1}$, $p_{\alpha_2}$, signal parameters $S_1$, $S_2$, interference parameters $I_1$, $I_2$, and noise parameter(s) N), and/or EDT selections via the X2 interface (e.g., at common times).

It should be understood that the example depicted in FIG. 5 is described with respect to one uncoordinated radio node pair 400 for clarity. When the first radio node 402(1) only identifies an uncoordinated radio node pair 400 with the second radio node 402(2), the EDT selected for the uncoordinated radio node pair 400 can be set as the operating EDT of the first radio node 402(1). In some examples, the first radio node 402(1) will identify additional uncoordinated radio node pairs with additional neighboring radio nodes. In these examples, the first radio node 402(1) can store the EDT selected for the uncoordinated radio node pair 400 and the EDT selected for the additional uncoordinated radio node pairs, then apply a voting algorithm to select the operating EDT, as is further described below with respect to FIG. 6. In other words, an example voting algorithm can set the operating EDT of the first radio node 402(1) to the selected EDT which is calculated or predicted to have a higher throughput for the network of radio nodes.

Figure 6:
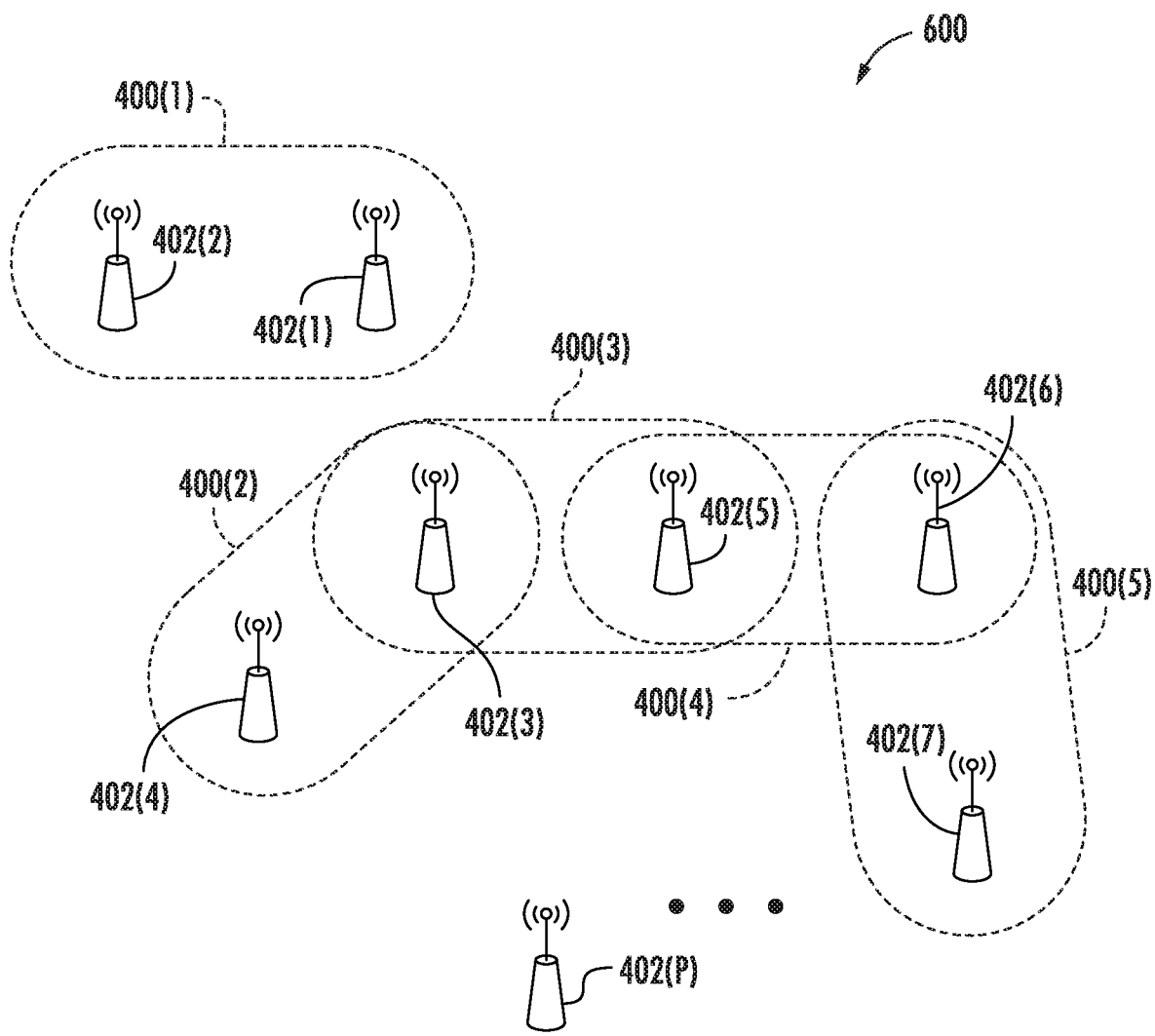
FIG. 6 is a schematic diagram of an exemplary wireless environment including multiple radio nodes, in which uncoordinated radio node pairs have been identified.

In this regard, FIG. 6 is a schematic diagram of an exemplary wireless environment 600, in which uncoordinated radio node pairs 400(1)-400(5) have been identified. The wireless environment 600 may include a number of radio nodes 402(1)-402(P), some or all of which may not be capable of coordinating EDT selections. To facilitate applying the throughput calculation algorithm to select the operating EDT of each radio node 402(1)-402(P), uncoordinated radio node pairs 400(1)-400(5) can be identified. The uncoordinated radio node pairs 400(1)-400(5) can be identified based on RSRP or RSSI between neighboring radio nodes 402(1)-402(P). For example, a first radio node 402(1) can be neighbored by a second radio node 402(2), as well as a third radio node 402(3) and a fourth radio node 402(4). In other words, because the first radio node 402(1) experiences a level of RF interference from each of the second radio node 402(2), the third radio node 402(3), and the fourth radio node 402(4), these radio nodes 402(2)-402(4) are neighboring radio nodes of the first radio node 402(1).

In this regard, the first radio node 402(1) (and/or user mobile communications devices in communication with the first radio node 402(1)) can measure an RSRP or RSSI for each of the second radio node 402(2), the third radio node 402(3), and the fourth radio node 402(4). The RSRP or RSSI of the second radio node 402(2) can be higher than the RSRP of the other radio nodes 402(3), 402(4) measured by the first radio node 402(1), and a first uncoordinated radio node pair 400(1) can be identified between the first radio node 402(1) and the second radio node 402(2) (e.g., because the second radio node 402(2) has the higher RSRP of the neighboring radio nodes 402(2)-402(4), or because only the RSRP of the second radio node exceeds a threshold). After the first uncoordinated radio node pair 400(1) is identified, the throughput calculation can be applied to the first uncoordinated radio node pair 400(1) as described above with respect to FIG. 5.

In another example, the third radio node 402(3) can identify a second uncoordinated radio node pair 400(2) with the fourth radio node 402(4), and identify a third uncoordinated radio node pair 400(3) with a fifth radio node 402(5) (e.g., because the RSRP/RSSI of each of the fourth radio node 402(4) and the fifth radio node 402(5) measured or received by the third radio node 402(3) exceeds a threshold). A fourth uncoordinated radio node pair 400(4) can be identified with the fifth radio node 402(5) and a sixth radio node 402(6), and a fifth uncoordinated radio node pair 400(5) can be identified with the sixth radio node 402(6) and a seventh radio node 402(7). In another example, a $P^{th}$ radio node 402(P) may not identify uncoordinated radio node pairs with any other radio nodes 402(1)-402(7) (e.g., because it does not detect RF interference from other radio nodes 402(1)-402(7), or the RSRP/RSSI from the other radio nodes 402(1)-402(7) does not exceed a threshold).

In this regard, in some examples, a radio node 402(1)-402(P) will identify multiple uncoordinated radio node pairs 400(1)-400(5) such that more than one EDT selection may be relevant to the radio node 402(1)-402(P). For example, the third radio node 402(3) can identify the second uncoordinated radio node pair 400(2) with the fourth radio node 402(4) and the third uncoordinated radio node pair 400(3) with the fifth radio node 402(5). After identifying the uncoordinated radio node pairs 400(2)-400(3), the throughput calculation algorithm is applied, and an EDT is selected, for each of the second uncoordinated radio node pair 400(2) and the third uncoordinated radio node pair 400(3). The third radio node 402(3) can store the EDT selected for the second uncoordinated radio node pair 400(2) and the EDT selected for the third uncoordinated radio node pair 400(3), then apply a voting algorithm to select the operating EDT of the third radio node 402(3). In a first aspect, the voting algorithm can set the operating EDT of the third radio node 402(3) to a lower EDT (e.g., the lowest EDT) selected for the second uncoordinated radio node pair 400(2) and the third uncoordinated radio node pair 400(3). For example, if the EDT selected for the second uncoordinated radio node pair 400(2) is a first EDT (e.g., a defined high EDT) and the EDT selected for the third uncoordinated radio node pair 400(3) is a second EDT, lower than the first EDT (e.g., a defined low EDT), the operating EDT of the third radio node 402(3) is set to the second EDT.

In a second aspect, the voting algorithm can set the operating EDT of the third radio node 402(3) based on a results driven approach. For example, the voting algorithm can set the operating EDT of the third radio node 402(3) to the selected EDT of the radio node pair 400(1)-400(5) which is predicted to have a higher throughput for the third radio node 402(3) or for wireless environment 600. As another example, a machine learning cost function can be defined as a function of the different EDT selections of the third radio node 402(3). An exemplary cost function can perform a regression between a measured throughput R and estimated throughput calculation function $\hat{R}$ as in Equation 5 above, adding scalers $\beta_1$ and $\beta_2$ as follows:

$$\hat{R} = (\gamma_1(\alpha_1, \alpha_2) + \beta_1) f_1\left(\frac{S_1}{N}\right) + (\gamma_2(\alpha_1, \alpha_2) + \beta_2) f_2\left(\frac{S_2}{N}\right) \qquad \text{Eq. 6}$$

In the exemplary cost function, a mean square equation between R and $\hat{R}$ is minimized as indicated below:

$$|\hat{R} - R|^2 \qquad \text{Eq. 7}$$

In this regard, the voting algorithm can also apply a weighted majority voting under the cost function, and the operating EDT of the third radio node 402(3) is set to the result of the weighted majority voting.

In an exemplary aspect of the disclosure, the throughput calculation algorithm and selection of EDTs for the radio nodes 402(1)-402(P), as well as the application of voting algorithms, is performed dynamically. In a first example, each radio node 402(1)-402(P) can periodically (e.g., after a minute or longer) select (e.g., optimize) its operating EDT. In another example, each radio node 402(1)-402(P) can update its EDT by applying the throughput calculation algorithm after the occurrence of an event, such as a change in measured throughput above or below a threshold, an increase or decrease in SINR, and so on. Generally, the uncoordinated radio node pairs 400(1)-400(5) can remain constant through multiple applications of the throughput calculation algorithm and EDT selections, but in some cases uncoordinated radio node pairs 400(1)-400(5) can also be determined from time to time or along with the EDT selections.

Second Approach—Iterative Process

Returning to FIG. 5 in a second exemplary aspect, the EDT of the first radio node 402(1) is dynamically adjusted based on an iterative approach which incorporates measurements of the neighboring second radio node 402(2). The first radio node 402(1) can set a first EDT as an initial EDT and then determine whether a collision exists between the first radio node 402(1) and the second radio node 402(2). Then the first radio node 402(1) can adjust to a second EDT which is predicted to avoid the collision. In an exemplary aspect, the controller circuit 504 dynamically selects EDTs based on the iterative approach. The controller circuit 504 can include a communication interface circuit, a processor circuit, and other components such as described below with respect to FIG. 11. In an exemplary aspect, the controller circuit 504 comprises or is included within the first radio node 402(1). In other examples, the controller circuit 504 can be coupled to the first radio node 402(1) and may comprise or be included within a central scheduler (e.g., central scheduler 322 of FIG. 3A), a services node (e.g., services node 214 of FIGS. 2-3B), or another network entity.

Figure 7:
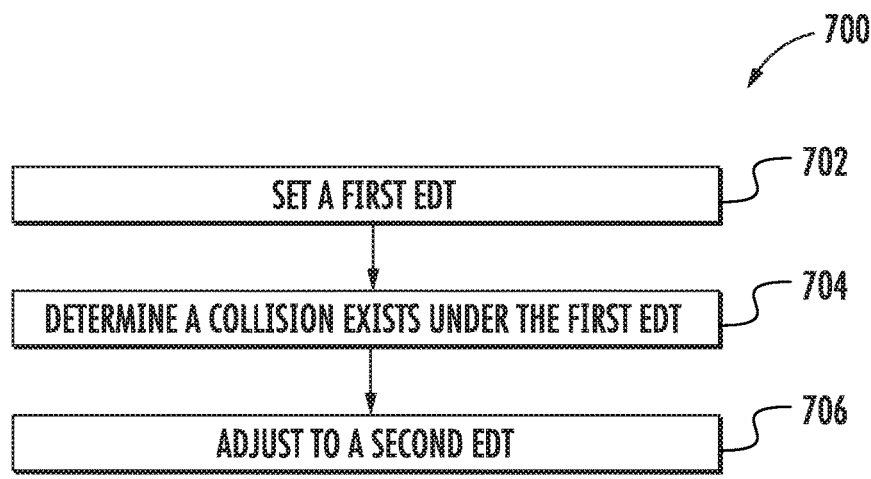
FIG. 7 is a flowchart illustrating an exemplary process of selecting an EDT for a first radio node.

With continuing reference to FIG. 5, FIG. 7 is a flowchart illustrating an exemplary process 700 of selecting an EDT for the first radio node 402(1). The process 700 comprises setting a first EDT (e.g., an initial EDT) for the first radio node 402(1) (block 702). The first EDT can be set according to an appropriate technique, such as initially setting a higher EDT, which may be based on the EDT limit under 3GPP's LAA and/or another wireless communication standard. In another example, the first EDT can be a lower EDT, such as a predetermined low EDT or an EDT at which the first radio node 402(1) can hear the second radio node 402(2). The first EDT may be based on a RSRP and/or a RSSI measured by the first radio node 402(1) and/or one or more devices in the first user mobile communications device group 502(1). The first EDT can be based on the minimum RSRP or RSSI measurement between the first radio node 402(1) and the second radio node 402(2), and may be 10 dB or 10 dBm below the RSRP or RSSI measured for the second radio node 402(2).

The process 700 also comprises determining that a collision exists when the first radio node 402(1) operates on the first EDT (block 704), which can be determined based on radio conditions monitored by the first radio node 402(1) and/or the first user mobile communications device group 502(1). The collision can further be determined based on a comparison of a modulation and coding scheme (MCS) of communications between the first radio node 402(1) and/or one or more devices in the first user mobile communications device group 502(1) compared with an RSRP or RSSI measurement, such as described further with respect to process 800 in FIG. 8. The process 700 also comprises adjusting to a second EDT which is predicted to avoid the collision (block 706), which can include increasing or decreasing the operating EDT based on whether the first radio node 402(1) hears the second radio node 402(2) and vice versa, as described further with respect to process 900 in FIG. 9.

Figure 8:
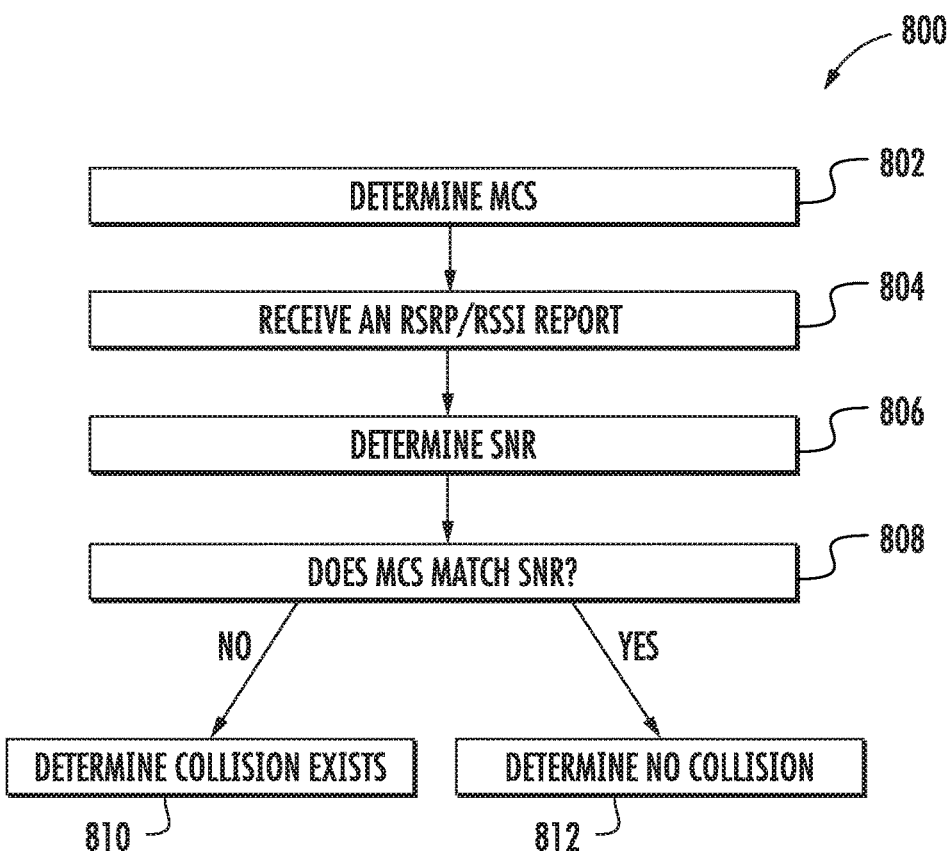
FIG. 8 is a flowchart illustrating an exemplary process of determining whether a collision exists between a first radio node and a second radio node.

FIG. 8 is a flowchart illustrating an exemplary process 800 of determining whether a collision exists between a first radio node 402(1) and a second radio node 402(2). The process 800 comprises determining an MCS for communications between the first radio node 402(1) and a user mobile communications device 208(1) (e.g., in the first user mobile communications device group 502(1) of FIG. 5) (block 802). In some examples, the MCS is set automatically by processors of the first radio node 402(1) and/or the user mobile communications device 208(1) (e.g, RF processor 1106 of FIG. 11 below), and may be based on the operating EDT of the first radio node 402(1) (e.g., the first EDT in process 700) and/or a detected occupancy of a wireless channel (e.g., the shared channel of the first radio node and the second radio node). The wireless channel occupancy can be detected by at least one of the first radio node 402(1) or the user mobile communications device 208(1).

The process 800 also comprises receiving an RSRP and/or RSSI report (block 804), which can be received from the user mobile communications device 208(1), or from multiple user communications devices 208(1), 208(3), 208(4). In some examples, the RSRP/RSSI report is measured by the first radio node 402(1) or another device. The process 800 also includes determining an SNR for the first EDT (block 806), which can be based on the RSRP/RSSI report. The process 800 also includes determining whether the MCS matches with the SNR (block 808). That is, for a given SNR, an MCS can be predicted in the absence of collisions from neighboring radio nodes. If the MCS does not match with the SNR, the process 800 can determine that a collision exists (block 810). If the MCS matches with the SNR, the process 800 can determine that no collision exists (block 812). The process 800 is described above with respect to MCS and RSSI/RSRP information, but in some cases the collision can be determined in a similar manner based on a block error rate (BLER) or channel quality indicator (CQI) report, or combinations of these.

Figure 9:
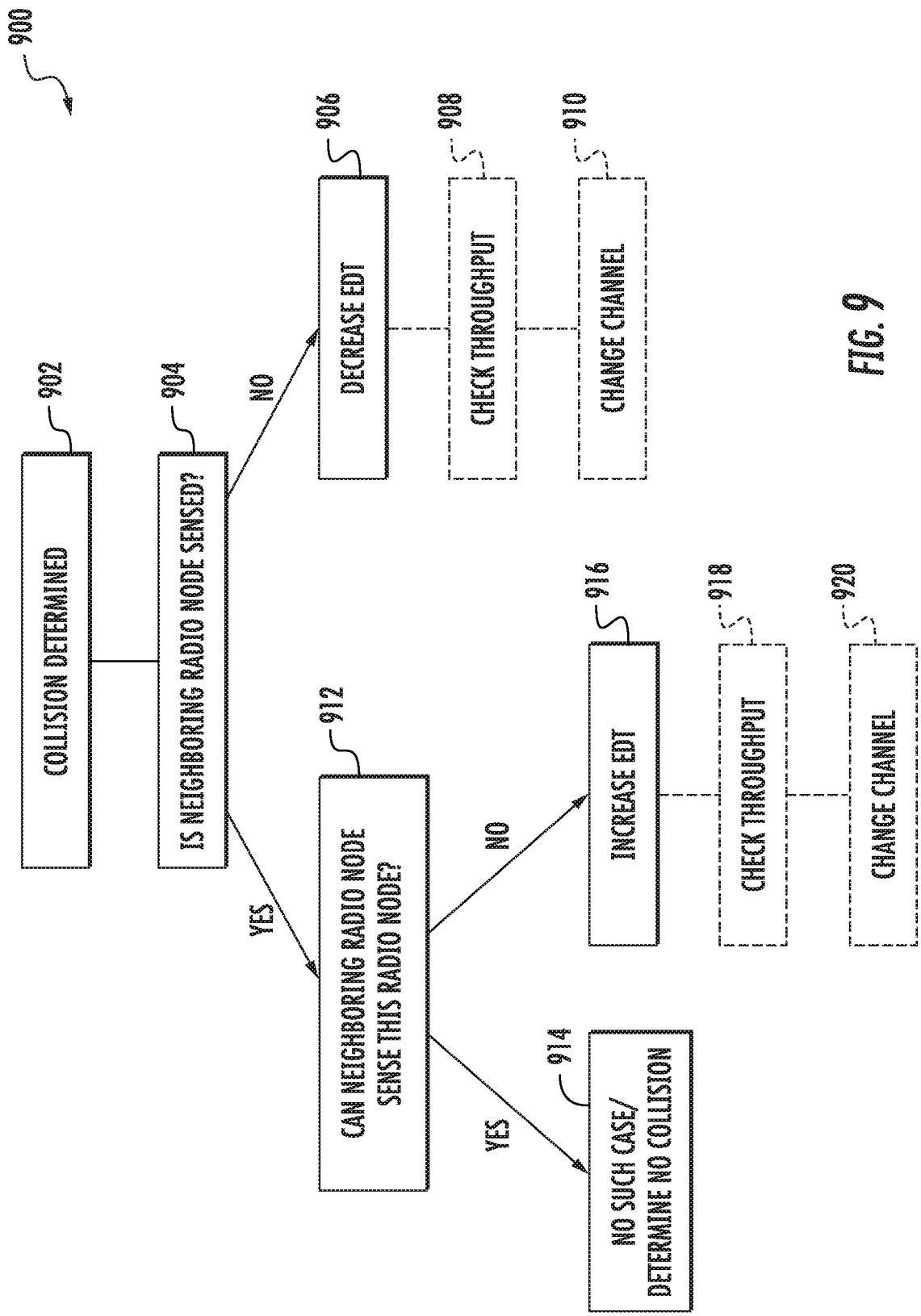
FIG. 9 is a flowchart illustrating an exemplary process of adjusting an EDT for a first radio node.

FIG. 9 is a flowchart illustrating an exemplary process 900 of adjusting an EDT for a first radio node 402(1). The process 900 comprises determining that a collision exists (block 902) between a first radio node 402(1) and a second radio node 402(2), as described above in block 810 of FIG. 8. The process 900 also comprises determining whether a neighboring radio node is sensed (block 904), which can include determining whether the first radio node 402(1) can detect communications from the second radio node 402(2). The determination whether the neighboring radio node is sensed can be based on whether the EDT is at or below an RSRP/RSSI measurement of the neighboring radio node (e.g., if the neighboring radio node is known). In another example, the neighboring radio node may not be known (e.g., an interference source has not been identified as a radio node), and the determination whether the neighboring radio node is sensed can be based on a frequency at which the first radio node 402(1) "backs off" (e.g., does not transmit) due to an LBT mechanism compared with a number of Wi-Fi access points from which the first radio node can detect communications (from which a probabilistic frequency of LBT back offs can be predicted).

If the neighboring radio node is not sensed at block 904, the process 900 also comprises decreasing an operating EDT of the first radio node 402(1) (e.g., selecting a second EDT which is lower than the initial first EDT) (block 906). Optionally, after the EDT is adjusted (here, decreased), the throughput is checked (block 908) when the first radio node 402(1) operates on the adjusted EDT (e.g., a throughput is determined based on the second EDT and compared with the throughput when the first radio node 402(1) operates on the first EDT). If the throughput while operating on the adjusted EDT has not improved, or is worse, the wireless channel of the first radio node may optionally be changed (block 910) (e.g., the first radio node may be operated in a different wireless channel).

If the neighboring radio node is sensed at block 904, the process 900 also comprises determining whether the neighboring radio node (e.g., the second radio node 402(2)) can sense the first radio node 402(1) (block 912), which can be based on active probing for Wi-Fi access points, active probing of the shared wireless channel, or a radio environment map (REM) scan. While such a case may not exist, if it is determined that the neighboring radio node can sense the first radio node 402(1), the process 900 also comprises determining that no collision exists (block 914). If it is determined that the neighboring radio node cannot sense the first radio node 402(1), the process 900 further comprises increasing an operating EDT of the first radio node 402(1) (e.g., selecting a second EDT which is higher than the initial first EDT) (block 916). Optionally, after the EDT is adjusted (here, increased), the throughput is checked (block 918) when the first radio node 402(1) operates on the adjusted EDT (e.g., a throughput is determined based on the second EDT and compared with the throughput when the first radio node 402(1) operates on the first EDT). If the throughput while operating on the adjusted EDT has not improved, or is worse, the wireless channel of the first radio node 402(1) may optionally be changed (block 920) (e.g., the first radio node 402(1) may be operated in a different wireless channel).

It should be understood that under the second, iterative approach outlined in FIGS. 7-9, some or all of the processes 700, 800, and 900 can be performed periodically (e.g., after a minute or longer) or in response to the occurrence of an event, such as a change in measured throughput above or below a threshold, an increase or decrease in SNR, and so on. For example, after completing the operations in blocks 906, 908, 910, 914, 916, 918, or 920, the operating EDT of the first radio node (e.g., the first EDT or the second EDT) may be maintained and the process(es) 700, 800, 900 can comprise monitoring or probing for collisions.

Figure 10:
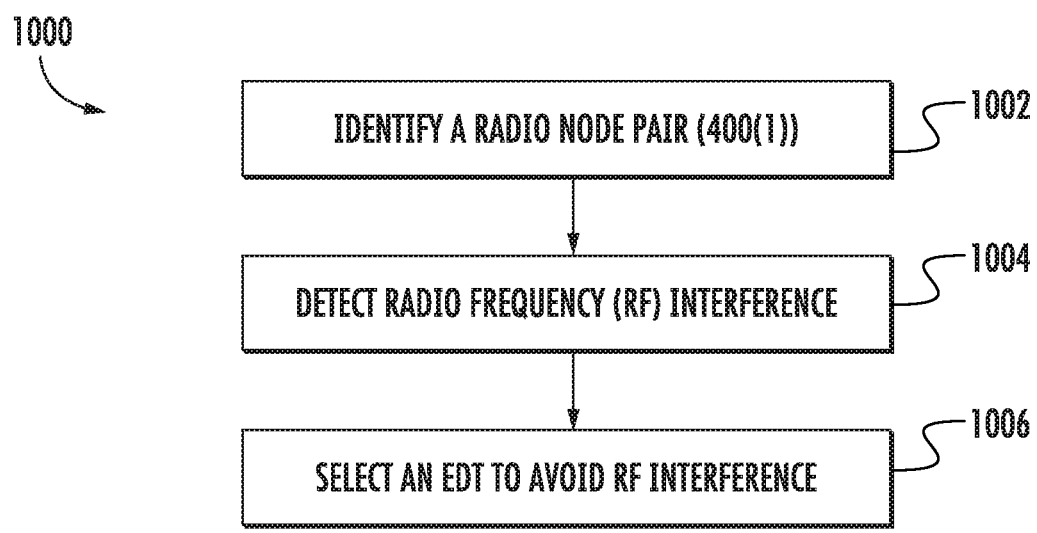
FIG. 10 is a flowchart illustrating an exemplary process of selecting an EDT for an uncoordinated radio node pair.

FIG. 10 is a flowchart illustrating an exemplary process 1000 of selecting an EDT for an uncoordinated radio node pair 400. The process 1000 comprises identifying a radio node pair 400(1) which comprises a first radio node 402(1) and a neighboring second radio node 402(2) (block 1002). The process 1000 also comprises detecting that the neighboring second radio node 402(2) causes RF interference to the first radio node 402(1) (block 1004), which can include determining the second radio node 402(2) causes RF interference exceeding a threshold or determining that a collision exists between the first radio node 402(1) and the second radio node 402(2). The process 1000 also comprises selecting an EDT for the first radio node 402(1) to avoid the RF interference (block 1006). The process 1000 can be applied as described above with respect to FIGS. 2-9. In a first example, blocks 1004 and 1006 can be performed according to the first approach described above with respect to FIGS. 5 and 6 based on a throughput calculation algorithm. In a second example, blocks 1004 and 1006 can be performed according to the second approach described above with respect to FIGS. 5 and 7-9 based on an iterative process.

Figure 11:
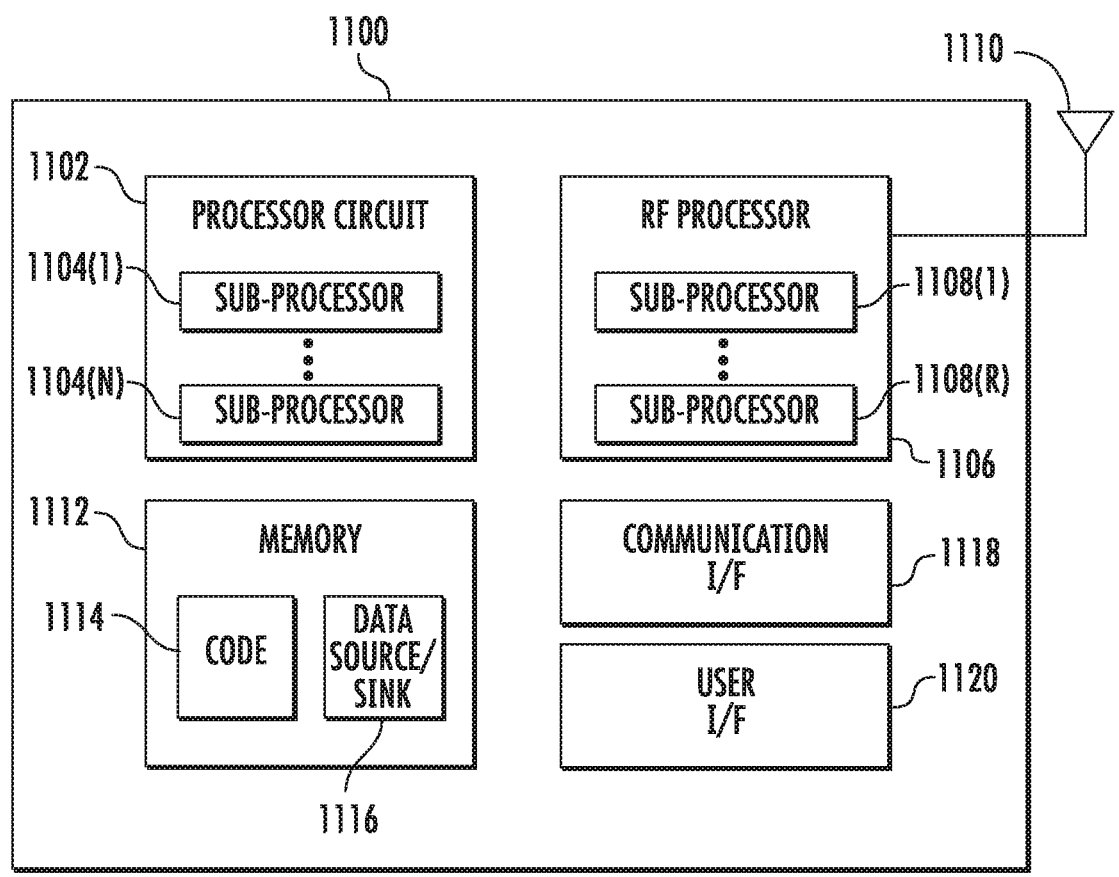
FIG. 11 is a schematic diagram of an exemplary computer system that can be implemented for a radio node, a central scheduler, a services node, or another network entity that may facilitate dynamically adjusting EDTs in radio nodes to improve throughput.

FIG. 11 shows a simplified functional block diagram 1100 of an illustrative computer system for a controller circuit 504, which can comprise or be included in a radio node 402(1)-402(P), a central scheduler 322, a services node 214 and/or another network entity that may facilitate dynamically adjusting an EDT in a radio nodes 402(1) to improve throughput. A processor circuit 1102 typically handles high level processing. The processor circuit 1102 may include one or more sub-processors 1104(1)-1104(N) or cores that are configured to handle specific tasks or functions. An RF processor 1106 implements various signal processing functions for radio frequency communications, including uplink and downlink signal processing. The RF processor 1106 may include one or more sub-processors 1108(1)-1108(R) or cores that are configured to handle specific tasks or functions. The RF processor 1106 is generally coupled to an RF antenna 1110 for transmitting and receiving RF signals. A memory 1112 is a computer-readable medium that stores computer-readable code 1114 that is executable by one or more processors including the processor circuit 1102 and/or the RF processor 1106. The memory 1112 may also include various data sources and data sinks (collectively represented by element 1116) that may provide additional functionalities.

The hardware infrastructure may also include various interfaces (I/Fs) including a communication I/F circuit 1118, which may be used, for example, to detect RF signals over a shared channel, determine a MCS for communications with a user mobile communications device 208(1) in communication with the first radio node 402(1), and can additionally implement a link to the services node 214 (of FIG. 2), LAN, a RAN and/or radio node 402(1)-402(P), or to an external processor, control, or data source. In some cases, a user I/F circuit 1120 may be utilized to provide various indications such as power status or to enable some local control of features or settings. More particularly, the RF processor 1106 may be eliminated in some applications and any functionality that it provides that is needed to implement the services node 214 may be provided by the processor circuit 1102.

While the computer-readable medium is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of selecting an energy detection threshold (EDT) for a first radio node deploying listen before talk, comprising:
   setting a first EDT for the first radio node;
   determining that a collision exists between the first radio node and a second radio node while operating on the first EDT;
   adjusting to a second EDT for the first radio node such that the collision is predicted to be avoided; and
   determining a modulation and coding scheme (MCS) for communications with a user mobile communications device in communication with the first radio node, wherein determining that the collision exists comprises:
  determining a signal-to-noise ratio (SNR) for the first EDT; and
  determining whether the MCS matches with the determined SNR, wherein the collision exists when the MCS does not match with the determined SNR.

2. The method of claim 1, further comprising:
measuring a first throughput for the first radio node operating on the first EDT;
measuring a second throughput for the first radio node operating on the second EDT; and
if the second throughput is not higher than the first throughput, operate the first radio node in a different wireless channel.

3. The method of claim 1, wherein determining the SNR for the first EDT comprises:
receiving a reference signal received power (RSRP) report from the user mobile communications device; and
determining the SNR for the first EDT based on the RSRP report.

4. The method of claim 1, further comprising determining whether the first radio node can detect communications from the second radio node operating on the first EDT;
  wherein adjusting to the second EDT comprises adjusting to a lower EDT when the first radio node cannot detect communications from the second radio node.

5. The method of claim 4, further comprising determining whether the second radio node can detect communications from the first radio node;
  wherein adjusting to the second EDT comprises adjusting to a higher EDT when the second radio node cannot detect communications from the first radio node.

6. The method of claim 5, wherein determining whether the second radio node can detect communications from the first radio node is based on at least one of active probing of a wireless channel or a radio environment map (REM) scan.

7. The method of claim 4, wherein determining whether the first radio node can detect communications from the second radio node is based on:
  a frequency at which the first radio node does not transmit due to a listen before talk (LBT) mechanism; and
  a number of Wi-Fi access points from which the first radio node can detect communications.

8. The method of claim 1, wherein the first EDT is based on an EDT limit according to a Third Generation Partnership Project (3GPP) specification.

9. The method of claim 1, further comprising measuring at least one of a reference signal received power (RSRP) or a received strength signal indicator (RSSI) from the second radio node;
  wherein the first EDT is based on at least one of the measured RSRP or the measured RSSI.

10. The method of claim 1, wherein the MCS is based on the first EDT.

11. The method of claim 1, wherein the MCS is based on occupancy of a wireless channel detected by at least one of the first radio node or the user mobile communications device.

12. A method of selecting an energy detection threshold (EDT) for a first radio node deploying listen before talk, comprising:
setting a first EDT for the first radio node;
determining that a collision exists between the first radio node and a second radio node while operating on the first EDT;
adjusting to a second EDT for the first radio node such that the collision is predicted to be avoided; and
determining whether the first radio node can detect communications from the second radio node operating on the first EDT;
  wherein adjusting to the second EDT comprises adjusting to a lower EDT when the first radio node cannot detect communications from the second radio node, and
wherein determining whether the first radio node can detect communications from the second radio node is based on:
  a frequency at which the first radio node does not transmit due to a listen before talk (LBT) mechanism; and
  a number of Wi-Fi access points from which the first radio node can detect communications.

13. The method of claim 12, further comprising determining a modulation and coding scheme (MCS) for communications with a user mobile communications device in communication with the first radio node.

14. The method of claim 13, wherein the MCS is based on the first EDT.

15. The method of claim 13, wherein the MCS is based on occupancy of a wireless channel detected by at least one of the first radio node or the user mobile communications device.

16. The method of claim 13, wherein determining that the collision exists comprises:
determining a signal-to-noise ratio (SNR) for the first EDT; and
determining whether the MCS matches with the determined SNR;
wherein the collision exists when the MCS does not match with the determined SNR.

17. The method of claim 12, further comprising maintaining the first EDT, and after a time, probing for the collision when the second radio node can detect communications from the first radio node.

18. The method of claim 12, wherein the first EDT is based on an EDT limit according to a Third Generation Partnership Project (3GPP) specification.

19. The method of claim 12, further comprising measuring at least one of a reference signal received power (RSRP) or a received strength signal indicator (RSSI) from the second radio node;
  wherein the first EDT is based on at least one of the measured RSRP or the measured RSSI.

* * * * *

UNITED STATES PATENT AND TRADEMARK OFFICE
CERTIFICATE OF CORRECTION

PATENT NO. : 10,764,927 B2
APPLICATION NO. : 16/203497
DATED : September 1, 2020
INVENTOR(S) : Chen et al.

It is certified that error appears in the above-identified patent and that said Letters Patent is hereby corrected as shown below:

In the Specification

On Column 23, Line 39, delete "distributed antenna"

Signed and Sealed this
Twentieth Day of September, 2022

Katherine Kelly Vidal
*Director of the United States Patent and Trademark Office*